United States Patent
Honda et al.

(10) Patent No.: US 8,434,303 B2
(45) Date of Patent: *May 7, 2013

(54) DRIVING DEVICE MADE OF SHAPE-MEMORY ALLOY

(75) Inventors: Yasuhiro Honda, Takatsuki (JP); Yasutaka Tanimura, Nara (JP); Natsuko Shiota, Ibaraki (JP); Yoshihiro Hara, Takatsuki (JP)

(73) Assignee: Konica Minolta Opto, Inc., Tokyo (JP)

( * ) Notice: Subject to any disclaimer, the term of this patent is extended or adjusted under 35 U.S.C. 154(b) by 381 days.

This patent is subject to a terminal disclaimer.

(21) Appl. No.: 12/812,572

(22) PCT Filed: Jan. 14, 2009

(86) PCT No.: PCT/JP2009/050388
§ 371 (c)(1),
(2), (4) Date: Jul. 12, 2010

(87) PCT Pub. No.: WO2009/090960
PCT Pub. Date: Jul. 23, 2009

(65) Prior Publication Data
US 2010/0296183 A1 Nov. 25, 2010

(30) Foreign Application Priority Data
Jan. 15, 2008 (JP) ................. 2008-005840

(51) Int. Cl.
*F01B 29/10* (2006.01)
*H02N 10/00* (2006.01)
*G02B 7/04* (2006.01)

(52) U.S. Cl.
USPC ................ 60/528; 60/527; 60/529; 310/306; 359/823

(58) Field of Classification Search ............ 60/527–529; 310/306–307; 359/820; 318/117
See application file for complete search history.

(56) References Cited

U.S. PATENT DOCUMENTS 4,977,886 A 12/1990 Takehana et al. ................. 128/4
5,685,149 A 11/1997 Schneider et al.
(Continued)

FOREIGN PATENT DOCUMENTS

AU 772107 B 3/2001
CA 2 391 746 A 2/2001
(Continued)

OTHER PUBLICATIONS

Ikuta, K.; "Micro/miniature shape memory alloy actuator", Robotics and Automation, 1990, Proceedings., 1990 IEEE International Conference on, vol., No., pp. 2156-2161 vol. 3, May 13-18, 1990 doi: 10.1109/ROBOT.1990.126323 URL: http://ieexplore.ieee.org/stamp.jsp?tp=&arnumber=126323&isnumber=3534.

*Primary Examiner* — Thomas Denion
*Assistant Examiner* — Ngoc T Nguyen
(74) *Attorney, Agent, or Firm* — Cozen O'Connor

(57) ABSTRACT

A storing section (70) stores a second initial contact instruction value, which is predefined as an instruction value for positioning a movable portion (5) to a second contact position where the movable portion (5) is contacted with a stopper (8), and an initial standby instruction value, which is predefined as an instruction value for positioning the movable portion (5) to a specified standby position within a moving range of the movable portion (5). A correcting section (42) calculates an actual standby instruction value by correcting the initial standby instruction value, based on a second actual contact instruction value obtained when a contact detection section (41) has detected that the movable portion (5) is positioned to the second contact position, and the second initial contact instruction value. A setting section (43) sets a standby position corresponding to the actual standby instruction value, as an actual standby position of the movable portion (5).

20 Claims, 15 Drawing Sheets

U.S. PATENT DOCUMENTS

| | | | |
|---|---|---|---|
| 6,434,932 B2 | 8/2002 | Hara et al. | |
| 6,516,146 B1 | 2/2003 | Kosaka | |
| 6,543,224 B1 | 4/2003 | Barooah | |
| 6,554,501 B2 | 4/2003 | Kosaka et al. | 396/452 |
| 6,574,958 B1 | 6/2003 | MacGregor | 60/527 |
| 6,981,374 B2 | 1/2006 | Von Behrens et al. | 60/527 |
| 7,650,752 B2 * | 1/2010 | Oohara | 60/528 |
| 7,688,533 B2 * | 3/2010 | Wada et al. | 359/823 |
| 7,823,383 B2 * | 11/2010 | Noda et al. | 60/528 |
| 7,953,319 B2 * | 5/2011 | Tanimura et al. | 396/133 |
| 8,068,167 B2 * | 11/2011 | Honda et al. | 348/357 |
| 2001/0002226 A1 | 5/2001 | Tanaka et al. | 396/440 |
| 2001/0025477 A1 | 10/2001 | Hara et al. | |
| 2001/0026687 A1 | 10/2001 | Kosaka et al. | 396/452 |
| 2001/0038418 A1 | 11/2001 | Suda et al. | 348/347 |
| 2002/0109784 A1 | 8/2002 | Suda et al. | 348/345 |
| 2002/0113499 A1 | 8/2002 | Von Behrens et al. | 310/12 |
| 2004/0261411 A1 | 12/2004 | MacGregor | 60/527 |
| 2006/0048511 A1 * | 3/2006 | Everson et al. | 60/527 |
| 2006/0148296 A1 | 7/2006 | Zanella et al. | |
| 2006/0162332 A1 | 7/2006 | Klaffenbach et al. | |
| 2007/0103555 A1 | 5/2007 | Eromaki | 348/208.4 |
| 2007/0175213 A1 | 8/2007 | Featherstone et al. | |
| 2009/0009656 A1 * | 1/2009 | Honda et al. | 348/372 |
| 2010/0045214 A1 * | 2/2010 | Matsuki | 318/117 |
| 2010/0257859 A1 * | 10/2010 | Honda | 60/528 |
| 2010/0293940 A1 * | 11/2010 | Noda et al. | 60/527 |
| 2010/0320943 A1 * | 12/2010 | Honda | 318/117 |

FOREIGN PATENT DOCUMENTS

| | | |
|---|---|---|
| CA | 2 439 148 A | 9/2002 |
| CN | 1369038 A | 11/2002 |
| CN | 1571882 A | 1/2005 |
| CN | 1298995 C | 2/2007 |
| DE | 600 31 687 T | 9/2007 |
| DE | 602 26 160 T2 | 7/2009 |
| EP | 1 203 156 A | 5/2002 |
| EP | 1 438 503 A | 7/2004 |
| EP | 1 203 156 B1 | 11/2006 |
| EP | 1 438 503 B1 | 4/2008 |
| JP | 2-266312 A | 10/1990 |
| JP | 4-340110 A | 11/1992 |
| JP | 6-114003 A | 4/1994 |
| JP | 2591149 B | 12/1996 |
| JP | 9-9131 A | 1/1997 |
| JP | 11-324896 A | 11/1999 |
| JP | 2000-112526 A | 4/2000 |
| JP | 2000-122124 A | 4/2000 |
| JP | 2001-263221 A | 9/2001 |
| JP | 2001-264841 | 9/2001 |
| JP | 2003-507625 A | 2/2003 |
| JP | 2004-536249 A | 12/2004 |
| JP | 2006-189045 | 7/2006 |
| JP | 2006-283575 A | 10/2006 |
| JP | 2006-329146 A | 12/2006 |
| JP | 2007-153077 A | 6/2007 |
| JP | 2007-333792 | 12/2007 |
| MX | PA 02001452 A | 7/2003 |
| MX | PA 03007620 A | 3/2005 |
| WO | WO 01/12985 A1 | 2/2001 |
| WO | WO 02/068820 A1 | 9/2002 |
| WO | WO 2007/018086 | 2/2007 |
| WO | WO 2007/051904 A1 | 5/2007 |
| WO | WO 2009/063845 | 5/2009 |
| WO | WO 2009/090960 A1 | 7/2009 |

* cited by examiner

US 8,434,303 B2

DRIVING DEVICE MADE OF SHAPE-MEMORY ALLOY

RELATED APPLICATIONS

This is a U.S. National Phase under 35 U.S.C. §371 of International Application No. PCT/JP2009/050388, filed Jan. 14, 2009, which claims priority to Japanese Patent Application No. 2008-005840, filed Jan. 15, 2008.

TECHNICAL FIELD

The present invention relates to a shape memory alloy driving device for moving a movable portion by utilizing the shape restoring ability of a shape memory alloy.

BACKGROUND ART

In recent years, an image pickup device employs a technology, wherein a movable portion for holding an image pickup lens is moved by utilizing the shape restoring ability of a shape memory alloy to position the image pickup lens. A shape memory alloy, however, has a drawback that it is impossible to start moving a movable portion immediately after start of energization of a shape memory alloy member, because the shape memory alloy member is not deformed unless heated over a predetermined temperature. Patent literature 1 discloses an improved technology, wherein the response speed of a movable portion is increased by energizing a shape memory alloy member in a standby state before start of driving the movable portion to a targeted position.

However, in the case where a movable portion is positioned by utilizing the shape restoring ability of a shape memory alloy, positional displacement may occur resulting from e.g. a change in the characteristic of the shape memory alloy due to a change in the ambient temperature or deterioration of the shape memory alloy, or deterioration of a moving mechanism portion for moving the movable portion. Accordingly, it has been difficult or impossible to apply a shape memory alloy to a device that requires positional precision, particularly an image pickup device designed such that an image pickup lens is required to be positioned to a standby position with high precision.

Patent literature 1: JP 2001-263221A

DISCLOSURE OF THE INVENTION

It is an object of the present invention to provide a shape memory alloy driving device capable of precisely positioning a movable portion to a specified standby position.

A shape memory alloy driving device includes: a movable portion; a moving mechanism portion which includes a shape memory alloy member, and moves the movable portion; a restraining member which is contactable with the movable portion to thereby restrain a movement of the movable portion, and defines a moving range of the movable portion; a drive control section which outputs a drive signal in accordance with an instruction value for positioning the movable portion to the shape memory alloy member, and controls the moving mechanism portion to move the movable portion by deforming the shape of the shape memory alloy member; a contact detecting section which detects whether the movable portion is positioned to a contact portion in contact with the restraining member; a storing section which stores initial position information for determining a relation between a position of the movable portion and an instruction value in an initial state; a correcting section which calculates an actual standby instruction value, based on an actual contact instruction value obtained when the contact detecting section has detected that the movable portion is positioned to the contact portion, and the initial position information; and a setting section which sets a standby position corresponding to the actual standby instruction value, as an actual standby position of the movable portion.

BEST MODE FOR CARRYING OUT THE INVENTION (First Embodiment)

Figure 1:
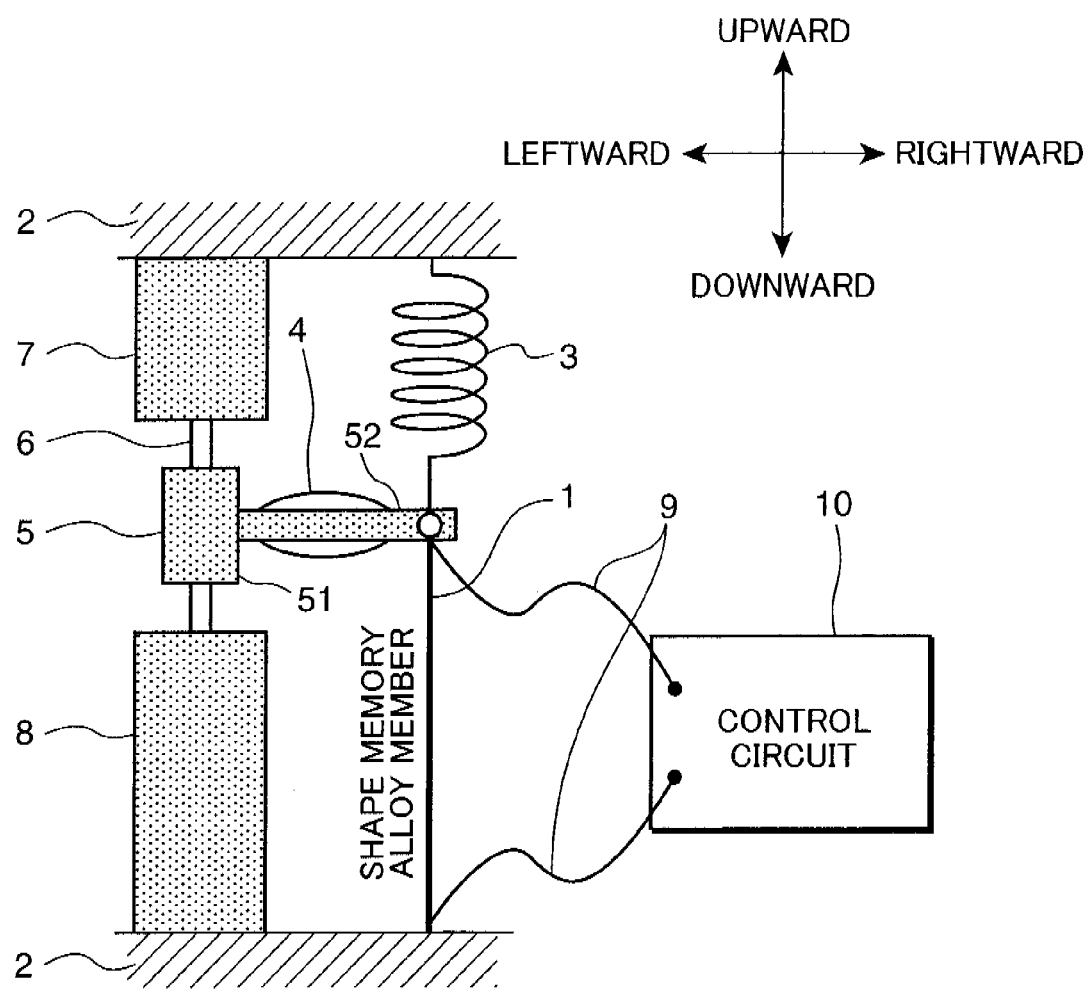
FIG. 1 is an external construction diagram of a shape memory alloy driving device embodying the invention.

In the following, a shape memory alloy driving device as the first embodiment of the invention is described referring to the drawings. In the following description, described is an example, wherein the shape memory alloy driving device is applied to an image pickup device. FIG. 1 is an external construction diagram of the shape memory alloy driving device. The shape memory alloy driving device includes a shape memory member 1, fixing portions 2, a bias spring 3, a lens 4, a movable portion 5, a guide shaft 6, stoppers 7 and 8, conductive wires 9, and a control circuit 10. The shape memory alloy member 1, the bias spring 3, and the guide shaft 6 correspond to an example of a moving mechanism portion, and the stoppers 7 and 8 correspond to an example of restraining members.

The shape memory alloy member 1 is a wire member extending in the vertical direction, and has an upper end thereof connected to a right end of the movable portion 5, and a lower end thereof connected to the lower fixing portion 2. The shape memory alloy member 1 is contracted to be restored into a specified memorized shape when heated over a predetermined temperature, and moves the movable portion 5 in the downward direction by a contracting force thereof. Further, both ends of the shape memory alloy member 1 are connected to the control circuit 10 through the conductive wires 9. The shape memory alloy member 1 is energized and heated by application of a drive current from the control circuit 10.

The fixing portions 2 are a pair of upper and lower fixing portions 2 and 2 which are fixedly attached to a casing of the image pickup device. The upper fixing portion 2 is connected to the stopper 7 and the bias spring 3, and the lower fixing portion 2 is connected to the stopper 8 and the shape memory alloy member 1. Further, the upper fixing portion 2 is formed with a hole (not shown) for guiding light from a subject to the lens 4, and the lower fixing portion 2 is formed with a hole (not shown) for guiding a subject light image formed by the lens 4 to an image sensor 80 (see FIG. 2).

The bias spring 3 has an upper end thereof connected to the upper fixing portion 2, and a lower end thereof connected to the right end of the movable portion 5 to apply an upward stress to the shape memory alloy member 1 so that the contracted shape memory alloy member 1 is extended in the upward direction to thereby move the movable portion 5 in the upward direction. The lens 4 is constituted of e.g. a convex lens. The lens 4 focuses light from a subject and guides the subject light image to the image sensor 80.

The movable portion 5 includes a movable main body 51 and a holding portion 52. The movable portion 5 is moved in the downward direction along the guide shaft 6 by a contracting force of the shape memory alloy member 1, and is moved in the upward direction along the guide shaft 6 by a bias force of the bias spring 3, whereby the lens 4 is moved in the upward and downward directions.

The movable main body 51 is formed with a through-hole extending in the vertical direction, and the guide shaft 6 is passed through the through-hole. The holding portion 52 extends from a generally vertically center position on a right surface of the movable main body 51 in the rightward direction, and holds the circular lens 4 in such a manner as to enclose the perimeter of the lens 4. An upper portion of a right end of the holding portion 52 is connected to a lower end of the bias spring 3, and a lower portion of the right end of the holding portion 52 is connected to the shape memory alloy member 1.

The guide shaft 6 is a rod-like member extending in the vertical direction, and has an upper end thereof connected to a lower surface of the stopper 7, and a lower end thereof connected to an upper surface of the stopper 8. The movable portion 5 is moved in the upward and downward directions while being guided along the guide shaft 6.

The stopper 7 has e.g. a rectangular parallelepiped shape or a cylindrical shape, and has an upper surface thereof fixedly attached to the upper fixing portion 2. The stopper 7 is contactable with an upper surface of the movable main body 51 to thereby restrict an upward movement of the movable portion 5. Thus, the stopper 7 defines the upper limit of the moving range of the movable portion 5.

The stopper 8 has e.g. a rectangular parallelepiped shape or a cylindrical shape, and has a lower surface thereof fixedly attached to the lower fixing portion 2. The stopper 8 is contactable with a lower surface of the movable main body 51 to thereby restrict a downward movement of the movable portion 5. Thus, the stopper 8 defines the lower limit of the moving range of the movable portion 5.

In the above arrangement, when the shape memory alloy member 1 is contracted/hardened by being heated, the bias spring 3 is extended, and when the heat is released from the shape memory alloy member 1, the shape memory alloy member 1 is softened and extended by a stress of the bias spring 3. Thus, the movable portion 5 for holding the lens 4 is moved. The control circuit 10 controls the movable portion 5 for positioning, and controls the overall operations of the image pickup device.

Figure 2:
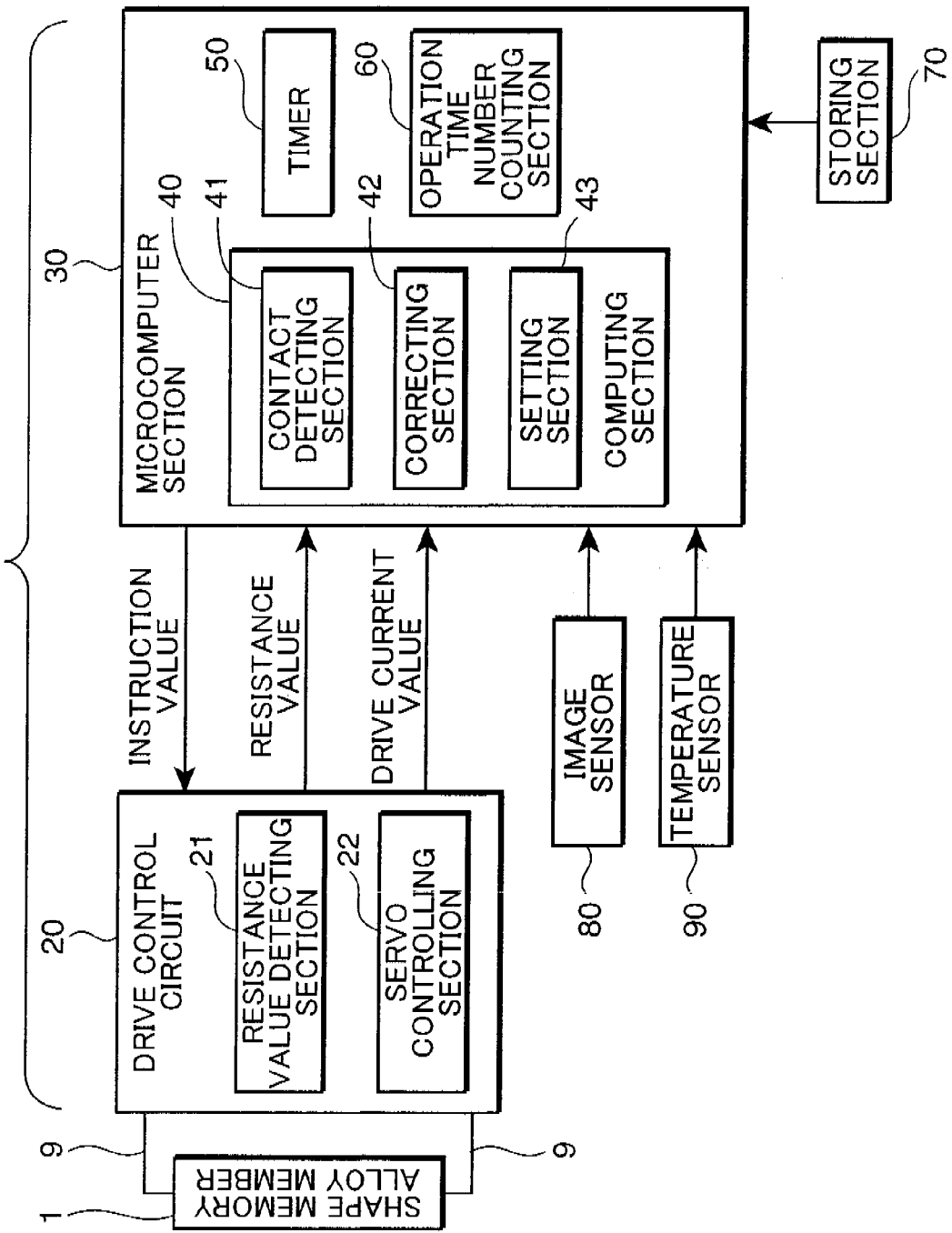
FIG. 2 is a block diagram of a control circuit.

FIG. 2 is a block diagram showing the control circuit 10. As shown in FIG. 2, the control circuit 10 includes a drive control circuit 20 (an example of a drive control section), a microcomputer section 30, a storing section 70, the image sensor 80, and a temperature sensor (an example of a temperature detecting section). The drive control circuit 20 is connected to the shape memory alloy member 1 through the conductive wires 9. The drive control circuit 20 includes a resistance value detecting section 21 and a servo controlling section 22. The drive control circuit 20 outputs, to the shape memory alloy member 1, a drive current in accordance with an instruction value for positioning the movable portion 5, changes the temperature of the shape memory alloy member 1, and deforms the shape of the shape memory alloy member 1 to thereby move the movable portion 5.

The resistance value detecting section 21 detects a resistance value of the shape memory alloy member 1 at e.g. a predetermined time interval, and outputs the detected resistance value to the microcomputer section 30 at e.g. a predetermined time interval. The servo controlling section 22 increases/decreases a drive current to be outputted to the shape memory alloy member 1 in such a manner that a resistance value of the shape memory alloy member 1 detected by the resistance value detecting section 21 becomes equal to a resistance value corresponding to an instruction value outputted from the microcomputer section 30. In this embodiment, the servo controlling section 22 stores in advance a relation between instruction values and resistance values, which is obtained by an experiment, and determines a resistance value in accordance with an instruction value by referring to the relation. The servo controlling section 22 outputs a drive current value to the microcomputer section 30 at a predetermined time interval, for instance.

The microcomputer section 30 includes a CPU, an ROM, and an RAM. The microcomputer section 30 further includes a computing section 40, a timer 50 (an example of a time measuring section) for measuring a time, and an operation time number counting section 60 (an example of a number counting section) for counting the number of times of operation of the shape memory alloy member 1. The computing section 40, the timer 50, and the operation time number counting section 60 may be realized by causing a CPU to execute a predetermined program, or may be realized by a dedicated hardware circuit.

The computing section 40 includes a contact detecting section 41, a correcting section 42, and a setting section 43. The contact detecting section 41 detects whether the movable portion 5 is positioned to a contact position in contact with the stopper 7, 8. In this embodiment, the contact detecting section 41 detects whether the movable portion 5 is positioned to a first contact position where the movable portion 5 is contacted with the stopper 7, and detects whether the movable portion 5 is positioned to a second contact position where the movable portion 5 is contacted with the stopper 8 by detecting a change in the resistance value. Specifically, the contact detecting section 41 calculates a change amount of the resistance value, based on resistance values to be outputted from the resistance value detecting section 21 at a predetermined time interval, determines that the movable portion 5 has left the stopper 7, 8, if the calculated change amount becomes larger than a predetermined value, and determines that the movable portion 5 has contacted with the stopper 7, 8, if the calculated change amount becomes smaller than the predetermined value.

The contact detecting section 41 may detect a contact position by detecting a change in a current flowing through the shape memory alloy member 1, or a voltage corresponding to the current, in place of using a resistance value. In the modification, the drive control circuit 20 may be provided with a current detecting section for detecting a current flowing through the shape memory alloy member 1 and outputting the detected current to the microcomputer section 30, or a voltage detecting section for detecting a voltage corresponding to the current and outputting the detected voltage to the microcomputer section 30, in place of providing the resistance value detecting section 21.

The storing section 70 stores initial position information for determining a relation between a position of the movable portion and an instruction value in an initial state. In this embodiment, the initial position information includes a first initial contact instruction value, which is predefined as an instruction value for positioning the movable portion 5 to the first contact position, a second initial contact instruction value, which is predefined as an instruction value for positioning the movable portion 5 to the second contact position, and an initial standby instruction value, which is predefined an instruction value for positioning the movable portion 5 to a predetermined standby position in the moving range. The first initial contact instruction value, the second initial contact instruction value, and the initial standby instruction value are e.g. values obtained by an experiment in a production process.

The correcting section 42 calculates an actual standby instruction value by correcting the initial standby instruction value, based on a second actual contact instruction value obtained when the contact detecting section 41 has detected that the movable portion 5 is positioned to the second contact position, and the second initial contact instruction value.

In this embodiment, assuming that the second initial contact instruction value is Xstop, the initial standby instruction value is Xstby, and the second actual contact instruction value is Xstop', the actual standby instruction value Xstby' is calculated, using e.g. the formula (1).

$$Xstby' = Xstby + (Xstop' - Xstop) \quad (1)$$

Alternatively, the correcting section 42 may calculate the actual standby instruction value Xstby' by correcting the initial standby instruction value Xstby, based on a first actual contact instruction value Xstart' obtained when the contact detecting section 41 has detected that the movable portion 5 is positioned to the first contact position, and the first initial contact instruction value Xstart. In the modification, the actual standby instruction value Xstby' may be calculated by the following formula (2).

$$Xstby' = Xstby + (Xstart' - Xstart) \quad (2)$$

The setting section 43 sets a standby position corresponding to the actual standby instruction value, as the actual standby position of the movable portion 5. Then, in the case where the movable portion 5 is moved to the standby position, the setting section 43 outputs an actual standby instruction value to the drive control circuit 20, and the servo controlling section 22 adjusts the drive current to such a level that a resistance value detected by the resistance value detecting section 21 becomes equal to a resistance value corresponding to the actual standby instruction value. Thereby, the movable portion 5 is positioned to a specified standby position.

Further, in the case where the movable portion 5 is positioned to a certain targeted position in the moving range, the setting section 43 calculates an instruction value corresponding to the targeted position, and outputs the calculated instruction value to the drive control circuit 20 to thereby position the movable portion 5 to the targeted position. In this embodiment, the setting section 43 stores in advance a relation between the respective positions of the movable portion 5 in the moving range, and an increment or a decrement of the instruction value at the respective positions, based on a standby position as a reference. The relation is obtained in advance by an experiment. In the case where the movable portion 5 is positioned to a certain targeted position, the setting section 43 calculates an instruction value with respect to the targeted position by adding or subtracting an increment or a decrement with respect to the targeted position to or from the actual standby instruction value calculated by the correcting section 42; and outputs the calculated instruction value to the drive control circuit 20.

The temperature sensor 90 is a temperature sensor such as a thermistor. The image sensor 80 is an image sensor such as a CMOS image sensor or a CCD image sensor. The image sensor 80 captures a subject image under the control of the control circuit 10, and acquires image data of the subject. The image data is subjected to a predetermined image processing by an unillustrated image processing section, and the processed image data is stored into an unillustrated image memory.

Figure 3:
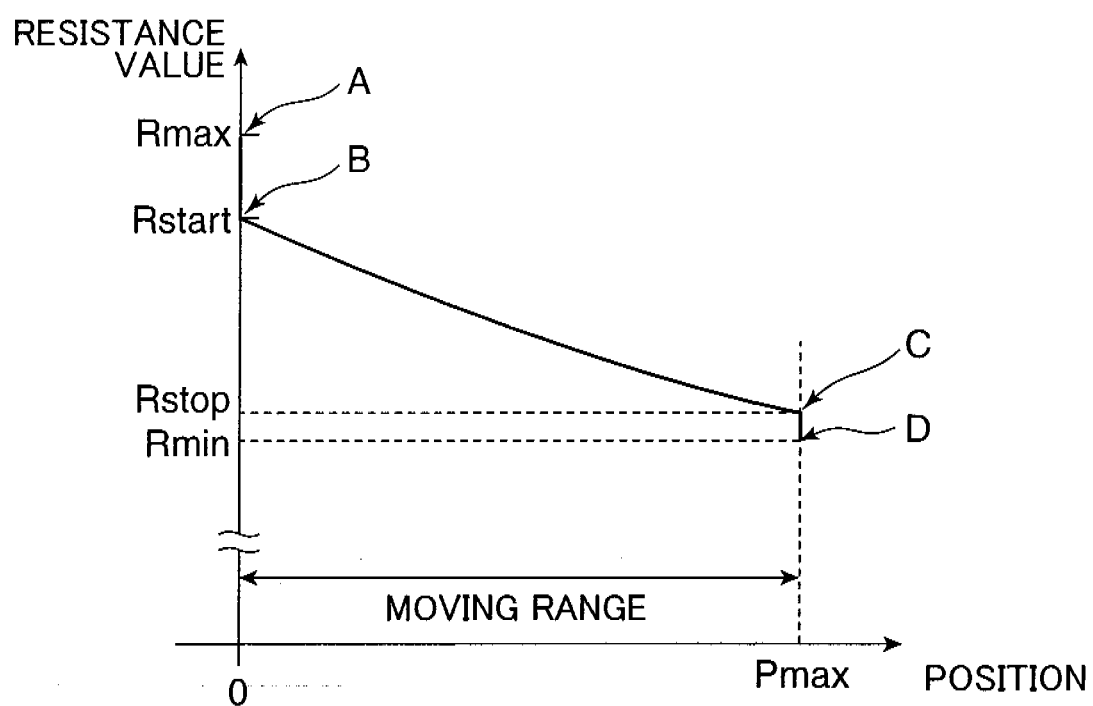
FIG. 3 is a graph showing a relation between a position of a movable portion, and a resistance value of a shape memory alloy member.

FIG. 3 is a graph showing a relation between a position of the movable portion 5, and a resistance value of the shape memory alloy member 1. In FIG. 3, the vertical axis denotes a resistance value, and the horizontal axis denotes a position of the movable portion 5. Referring to FIG. 3, the position 0 indicates the first contact position, and the position Pmax indicates the second contact position where the movable portion 5 is contacted with the stopper 8.

At the position 0, the shape memory alloy member 1 is extended by the bias spring 3, because the drive current to be applied to the shape memory alloy member 1 is small and the temperature of the shape memory alloy member 1 is low. Accordingly, the movable portion 5 is contacted with the stopper 7, and is positioned to the first contact position. At the point A, the drive current is set to a minimum value, and the resistance value is set to the maximum resistance value Rmax of the shape memory alloy member 1.

As the drive current to be applied to the shape memory alloy member 1 is gradually increased, the resistance value is decreased, and the contracting force of the shape memory alloy member 1 is increased. At the point B where the contracting force exceeds the stress by the bias spring 3, the movable portion 5 leaves the stopper 7, and starts moving. The resistance value at this point of time is set to Rstart.

Thereafter, the movable portion 5 is moved toward the position Pmax by the contracting force of the shape memory alloy member 1, as the drive current is increased. Then, the movable portion 5 is moved to the point C when the movable portion 5 is contacted with the stopper 8. At the point C, the movable portion 5 is positioned to Pmax, and the resistance value of the shape memory alloy member 1 is set to Rstop.

As the drive current is further increased, the resistance value is decreased. However, since the movement of the movable portion 5 is restrained by the stopper 8, the movable portion 5 is not changed any more. At the point D, the drive current becomes a maximum value, and the resistance value becomes the minimum resistance value Rmin of the shape memory alloy member 1.

As described above, the points B and C as inflection points appear in the graph showing the relation between a position of the movable portion 5 and a resistance value. Accordingly, judgment as to whether the movable portion 5 is contacted with the stopper 7, 8 can be made by detecting a change in the resistance value of the shape memory alloy member 1.

Figure 4:
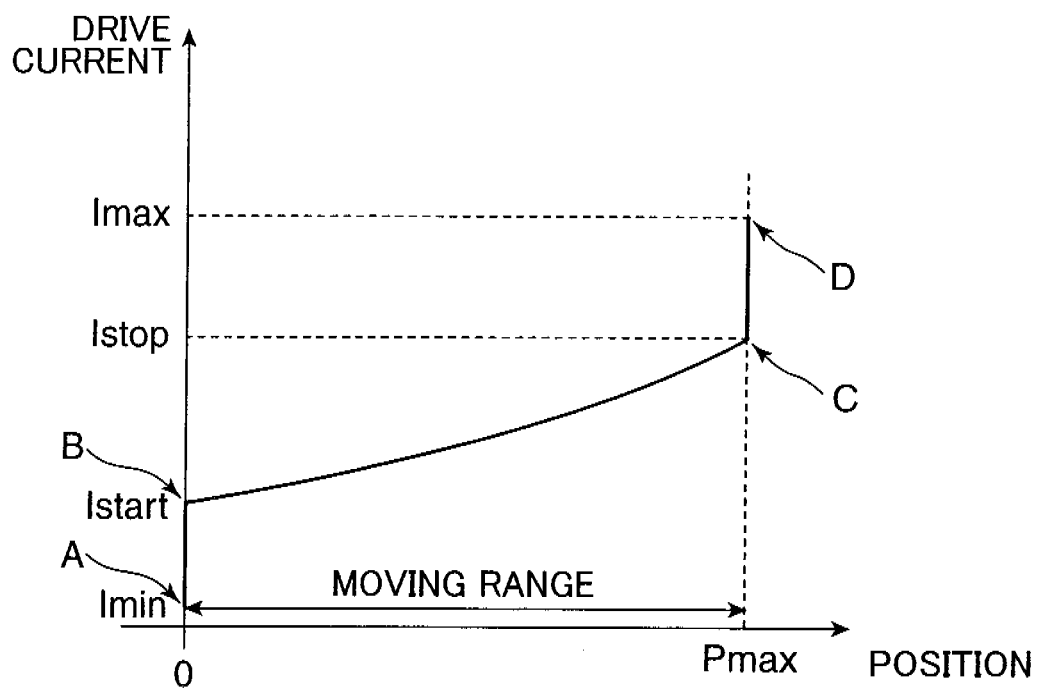
FIG. 4 is a graph showing a relation between a position of the movable portion, and a drive current to be applied to the shape memory alloy member.

FIG. 4 is a graph showing a relation between a position of the movable portion 5, and a drive current to be applied to the shape memory alloy member 1. At the point A, the drive current is set to the minimum value Imin, the movable portion 5 is contacted with the stopper 7, and the position of the movable portion 5 is set to 0.

Then, as the drive current is gradually increased, at the point B, the movable portion 5 leaves the stopper 7, and starts moving toward Pmax. At this point of time, the drive current is set to Istart.

Thereafter, as the drive current is increased, the position of the movable portion 5 is increased by contraction of the shape memory alloy member 1. Then, at the point C where the movable portion 5 is contacted with the stopper 8, the position of the movable portion 5 is set to the maximum value Pmax, and the drive current is set to Istop.

Thereafter, even if the drive current is further increased, displacement of the movable portion 5 is restrained by the stopper 8, and the movable portion 5 is kept unmoved. At the point D, the drive current becomes the maximum value Imax.

As described above, the points B and C as inflection points appear in the graph showing a relation between a position of the movable portion 5, and a drive current. Accordingly, the contact detecting section 41 is allowed to judge whether the movable portion 5 is contacted with the stopper 7, 8 by detecting a change in the current flowing through the shape memory alloy member 1, in place of using a resistance value.

Figure 5:
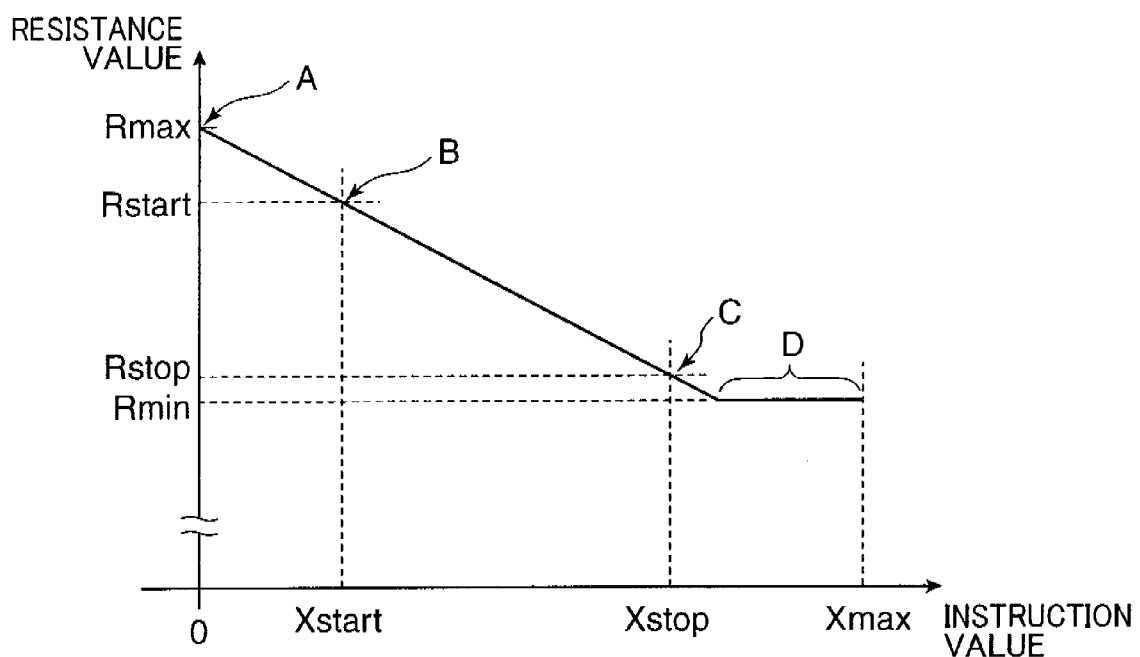
FIG. 5 is a graph showing a relation between an instruction value to be outputted from a microcomputer section, and a resistance value of the shape memory alloy member.

FIG. 5 is a graph showing a relation between an instruction value to be outputted from the microcomputer section 30, and a resistance value of the shape memory alloy member 1. In FIG. 5, the vertical axis denotes a resistance value, and the horizontal axis denotes an instruction value. In the graph shown in FIG. 5, when the instruction value is set to 0, the servo controlling section 22 sets the drive current to a minimum value, sets the resistance value to the maximum resistance value Rmax, increases the instruction value, and decreases the resistance value.

At the point A, the instruction value is set to 0, the drive current is set to a minimum value, and the resistance value is set to Rmax. Then, as the instruction value is gradually increased, the servo controlling section 22 increases the drive current in such a manner that a resistance value corresponding to the instruction value is obtained. Thereby, the resistance value is reduced.

At the point B, the resistance value becomes Rstart, the movable portion 5 leaves the stopper 7, and the position of the movable portion 5 starts increasing. The instruction value at this point of time is set to Xstart.

Thereafter, the movable portion 5 is moved in the downward direction by contraction of the shape memory alloy member 1 resulting from an increase in the instruction value. Then, at the point C where the movable portion 5 is contacted with the stopper 8, the resistance value of the shape memory alloy member 1 is set to Rstop, and the instruction value is set to Xstop.

As the instruction value is further increased, although the resistance value is decreased, the position of the movable portion 5 is kept unchanged, because the movement of the movable portion 5 is restricted by the stopper 8. In the range D, the drive current is kept to a maximum value, and the resistance value is kept to Rmin. In the range D, since the servo controlling section 22 saturates the drive current at the maximum value by a restricting circuit, even if the instruction value is increased, the resistance value is kept to Rmin until the instruction value is set to the maximum value Xmax.

Figure 6:
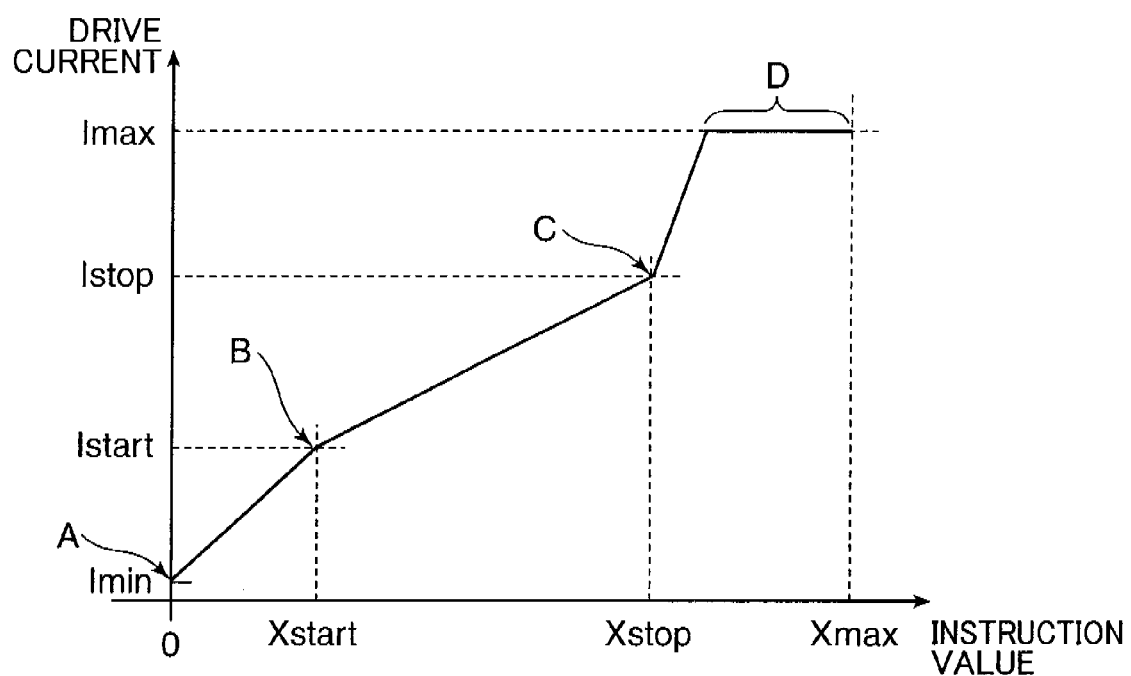
FIG. 6 is a graph showing a relation between an instruction value to be outputted from the microcomputer section, and a drive current to be applied to the shape memory alloy member.

FIG. 6 is a graph showing a relation between an instruction value to be outputted from the microcomputer section 30, and a drive current to be outputted to the shape memory alloy member 1. At the point A, the instruction value is set to 0, and the drive current to be applied to the shape memory alloy member 1 is set to the minimum value Imin.

As the instruction value is gradually increased, the resistance value is decreased, and the drive current is increased. At the point B, the drive current is set to Istart, and the movable portion 5 leaves the stopper 7 and starts moving. The instruction value at this point of time is set to Xstart.

Thereafter, as the instruction value is increased, the position of the movable portion 5 is moved in the downward direction by a contracting force of the shape memory alloy member 1. Then, until the point C where the movable portion 5 is contacted with the stopper 8, the position of the movable portion 5 is increased, and the drive current is set to Istop at the point C. At this point of time, the instruction value is set to Xstop.

As the instruction value is further increased, the drive current is increased. However, the position of the movable portion 5 is kept unchanged, because the position of the movable portion 5 is restricted by the stopper 8. In the range D, the drive current is kept to the maximum value Imax. In the range D, the servo controlling section 22 saturates the drive current at the maximum value by the restricting circuit. Accordingly, the drive current is kept to the maximum value until the instruction value is set to the maximum value Xmax, even if the instruction value is increased.

Figure 7:
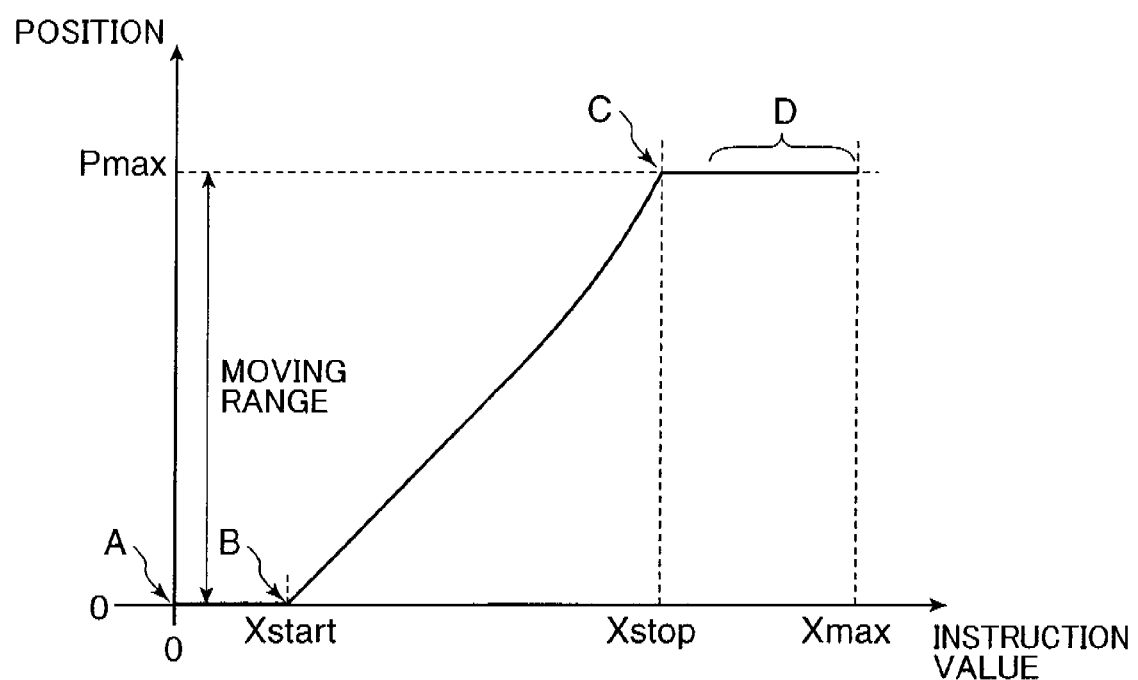
FIG. 7 is a graph showing a relation between an instruction value to be outputted from the microcomputer section, and a position of the movable portion.

FIG. 7 is a graph showing a relation between an instruction value to be outputted from the microcomputer section 30, and a position of the movable portion 5. Referring to FIG. 7, the movable portion 5 is kept in contact with the stopper 7, and positioned to 0 from the point A to the point B i.e. from the point of time when the instruction value is set to 0 to the point of time when the instruction value is set to Xstart.

Then, as the instruction value is gradually increased, the position of the movable portion 5 is gradually increased by servo control, and at the point C, the position of the movable portion 5 is set to the maximum value Pmax. The instruction value at this point of time is set to Xstop. Thereafter, even if the instruction value is increased to Xmax, the position of the movable portion 5 is kept unchanged, because the movement of the movable portion 5 is restricted by the stopper 8.

Figure 8:
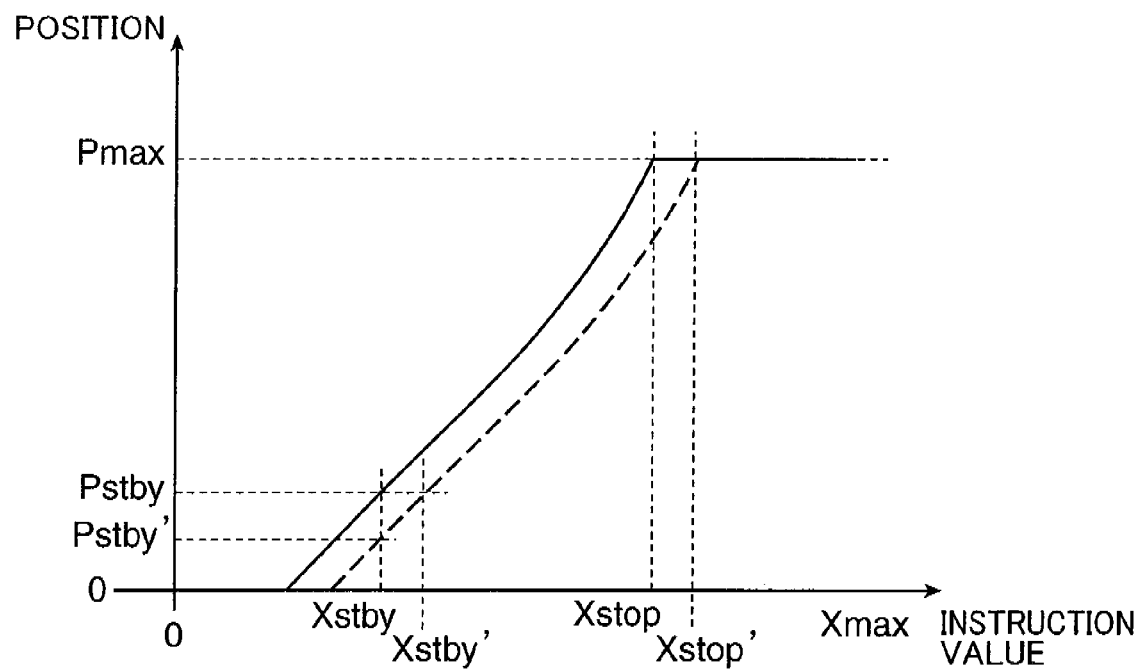
FIG. 8 is a diagram showing a relation between a position of the movable portion, and an instruction value.

FIG. 8 is a diagram showing a relation between a position of the movable portion 5 and an instruction value. The solid-line graph in FIG. 8 is a graph before the relation is changed, and the dotted-line graph in FIG. 8 is a graph after the relation is changed. Pstby in FIG. 8 indicates an initial standby position. Assuming that the instruction value is set to Xstby in the solid-line graph, the servo controlling section 22 positions the movable portion 5 to the targeted standby position Pstby.

Now, let us assume that the relation between a position of the movable portion 5 and an instruction value is changed from the state shown by the solid-line graph to the state shown by the dotted-line graph, resulting from e.g. a change in the ambient temperature, or aging deterioration of members such as the shape memory alloy member 1.

In the above case, if the instruction value is set to Xstby, the movable portion 5 is positioned to Pstby', which is displaced from the specified standby position Pstby. In this embodiment, assuming that the dotted line graph is shifted in parallel to the horizontal axis with respect to the solid-line graph, the displacement between Xstop and Xstop' becomes equal to the displacement between Xstby and Xstby'.

Accordingly, the actual standby instruction value Xstby', which is an instruction value for positioning the movable portion 5 to a specified standby position, can be obtained by storing the values Xstop and Xstby in advance into the storing section 70, allowing the correcting section 42 to acquire the second actual contact instruction value Xstop', which is an instruction value for actually contacting the movable portion 5 with the stopper 8, and substituting the value Xstop' into the formula (1).

Then, as shown by the dotted line graph in FIG. 8, when the value Xstby' is defined as the instruction value, the movable portion 5 is positioned to the specified standby position Pstby.

Figure 9:
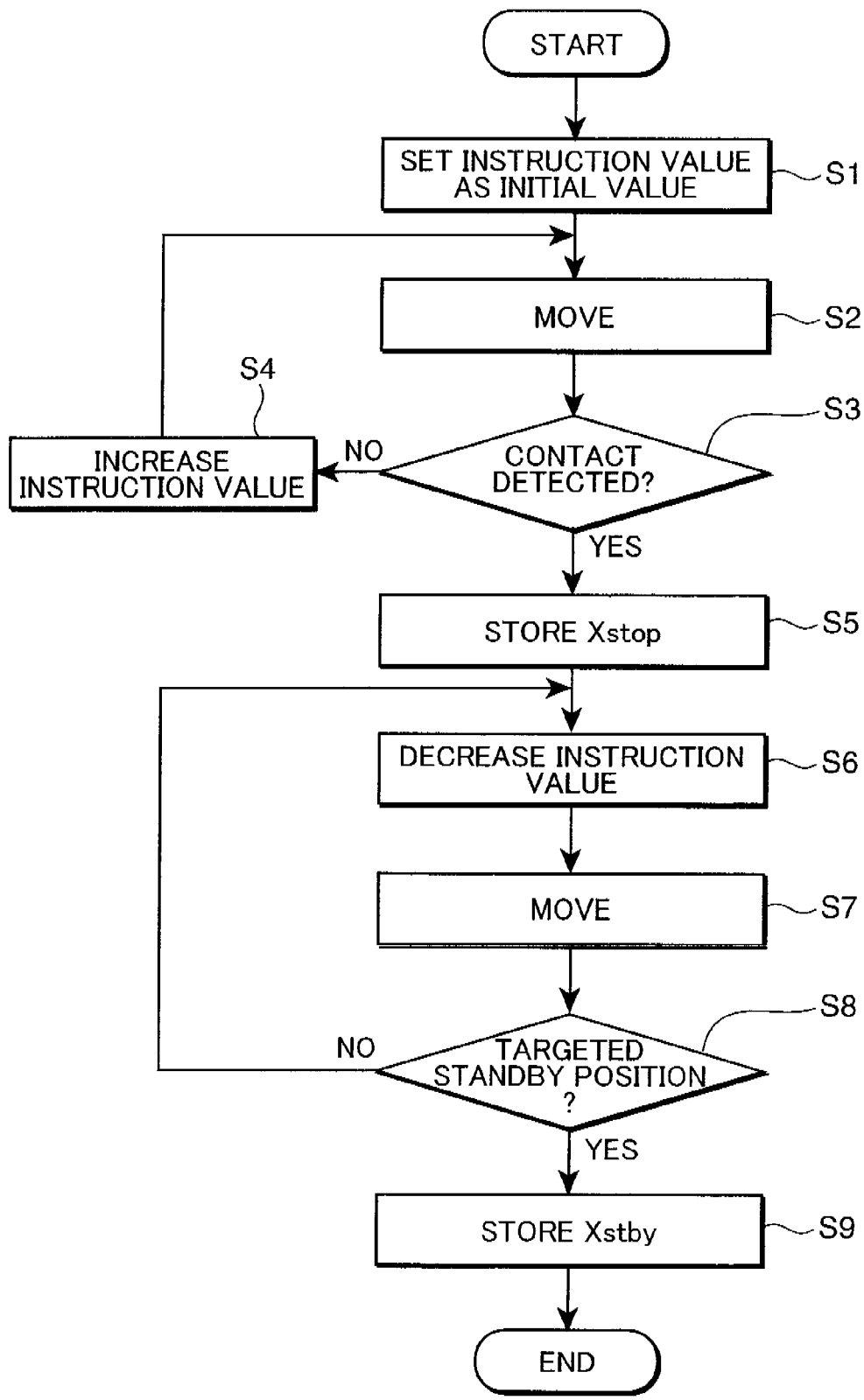
FIG. 9 is a flowchart showing an initial sequence.

Next, an initial sequence for detecting the second initial contact position and the initial standby position is described. FIG. 9 is a flowchart showing the initial sequence. First, the setting section 43 sets an instruction value as an initial value to detect the second contact position (Step S1). In this embodiment, it is preferable to use a value sufficiently smaller than a value which is estimated to be the second initial contact instruction value, as the initial value.

Then, the servo controlling section 22 moves the movable portion 5 by adjusting the drive current to such a level that a resistance value detected by the resistance value detecting section 21 becomes equal to a resistance value corresponding to the instruction value set by the setting section 43 (Step S2). Then, the contact detecting section 41 detects whether the movable portion 5 has contacted with the stopper 8 (Step S3). Then, in the case where the contact detecting section 41 has detected that the movable portion 5 is contacted with the stopper 8 (YES in Step S3), the setting section 43 writes the instruction value set in the above case into the storing section 70, as the second initial contact instruction value Xstop.

If, on the other hand, the judgment result in Step S3 is negative (NO in Step S3), the setting section 43 increases the instruction value by a predetermined value (Step S4), and the routine returns to Step S2. Thus, the operations in Step S2 through Step S4 are repeated to detect the second initial contact instruction value Xstop.

Then, the setting section 43 decreases the instruction value by a predetermined value (Step S6). Then, the servo controlling section 22 moves the movable portion 5 by adjusting the drive current to such a level that a resistance value detected by the resistance value detecting section 21 becomes equal to a resistance value corresponding to the instruction value set by the setting section 43 (Step S7).

Then, the setting section 43 judges whether the movable portion 5 is positioned to a targeted standby position (Step S8). In this embodiment, the setting section 43 causes the image sensor 80 to capture an image of a test chart, and judges whether the movable portion 5 is positioned to a targeted standby position based on the acquired image data. In this embodiment, a reference focus position at which an image of a subject away from the image pickup device by a certain distance is focused, or a reference zoom position at which an image of a subject is captured with a certain magnification ratio, is used as a standby position. In the case where the reference focus position is used as a standby position, a test chart is disposed at a position away from the image pickup device by a certain distance to capture an image of the test chart, and the position of the movable portion 5, at which focused image data is obtained, is defined as the targeted standby position.

In the case where the reference zoom position is used as a standby position, a test chart of a predetermined size is disposed at a position away from the image pickup device by a predetermined distance to capture an image of the test chart, and the position of the movable portion 5, at which the size of the test chart in the obtained image data becomes equal to a predetermined size, is defined as the targeted standby position.

In Step S8, in the case where the setting section 43 judges that the movable portion 5 is positioned to the targeted standby position (YES in Step S8), the instruction value set in the above case is written into the storing section 70, as the initial standby instruction value Xstby (Step S9).

If, on the other hand, the judgment result in Step S8 is negative (NO in Step S8), the routine returns to Step S6, wherein the setting section 43 decreases the instruction value by a predetermined value. As described above, the operations in Step S6 through Step S8 are repeated to detect the initial standby instruction value Xstby.

Thus, the initial sequence is ended. The initial sequence is performed in an adjusting step of a production process of the product, for instance.

Figure 10:
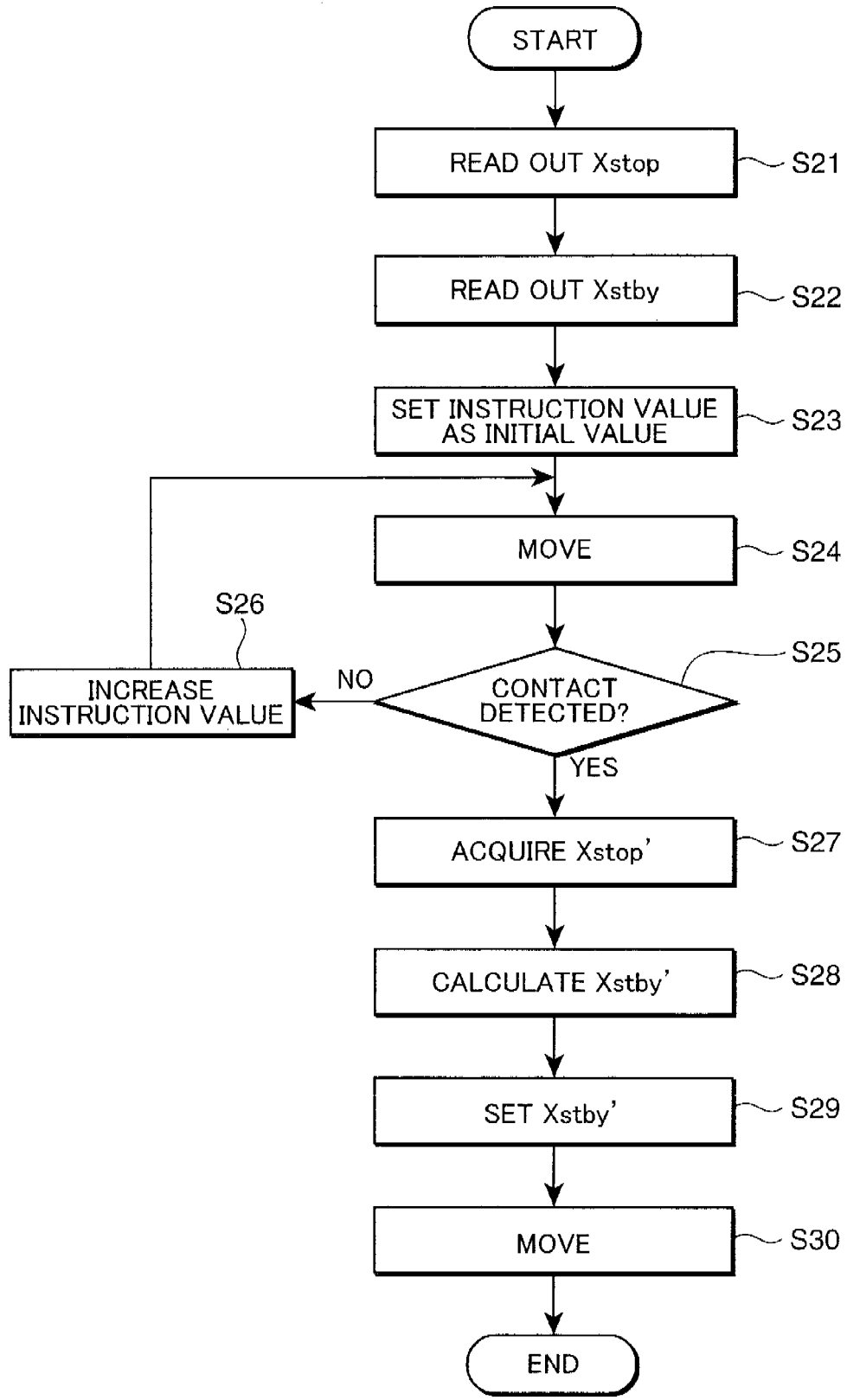
FIG. 10 is a flowchart showing a correction process.

Next, a correction process is described. FIG. 10 is a flowchart showing a correction process. First, the correcting section 42 reads out the second initial contact instruction value Xstop from the storing section 70 (Step S21). Then, the correcting section 42 reads out the initial standby instruction value Xstby from the storing section 70 (Step S22).

Then, the setting section 43 sets an instruction value as an initial value to detect the second contact position (Step S23). In this embodiment, it is preferable to use a value sufficiently smaller than the second initial contact instruction value, as the initial value.

Then, the servo controlling section 22 moves the movable portion 5 by adjusting the drive current to such a level that a resistance value detected by the resistance value detecting section 21 becomes equal to a resistance value corresponding to the instruction value set by the setting section 43 (Step S24). Then, the contact detecting section 41 detects whether the movable portion 5 has contacted with the stopper 8 (Step S25). Then, in the case where the contact detecting section 41 has detected that the movable portion 5 is contacted with the stopper 8 (YES in Step S25), the correcting section 42 acquires the instruction value set in the above case, as the second actual contact instruction value Xstop' (Step S27).

If, on the other hand, the judgment result in Step S25 is negative (NO in Step S25), the setting section 43 increases the instruction value by a predetermined value (Step S26), and the routine returns to Step S24.

Then, the correcting section 42 calculates the actual standby instruction value Xstby' by substituting the second initial contact instruction value Xstop read out in Step S21, the initial standby instruction value Xstby read out in Step S22, and the second actual contact instruction value Xstop' acquired in Step S27 into the formula (1) (Step S28).

Then, the setting section 43 sets the actual standby instruction value Xstby' calculated in Step S28, as an instruction value (Step S29). Then, the servo controlling section 22 moves the movable portion 5 to the standby position by adjusting the drive current to such a level that a resistance value detected by the resistance value detecting section 21 becomes equal to a resistance value corresponding to the instruction value set by the setting section 43 (Step S30). Thus, the correction process is ended, the correction sequence is completed, and the image pickup device is brought to a standby state.

As described above, the shape memory alloy driving device of the first embodiment is operable to calculate the actual standby instruction value by correcting the initial standby instruction value, based on a displacement between the second actual contact instruction value obtained when the contact detecting section 41 has detected that the movable portion 5 is positioned to the second contact position, and the initial contact instruction value. Accordingly, the shape memory alloy driving device is advantageous in precisely positioning the movable portion to a specified standby position.

In the above arrangement, the correcting section 42 may perform the correction process in response to e.g. turning on of the power source of the image pickup device, or in response to detection of a change of a detection temperature by the temperature sensor 90 by a predetermined value. Further alternatively, the correcting section 42 may perform the correction process, each time an operation time of the image pickup device measured by the timer 50 has exceeded a predetermined time, after turning on of the power source of the image pickup device.

Further alternatively, the correcting section 42 may perform the correction process each time the number of times of operation of the shape memory alloy member 1, which has been counted by the operation time number counting section 60, is changed by a predetermined value. In the modification, the operation time number counting section 60 increments the number by one, in the case where the instruction value is set by the setting section 43 to move the movable portion 5 to a certain targeted position. Further alternatively, the correcting section 42 may perform the correction process in association with the point of time when the power source of the image pickup device is turned on, the point of time when the detection temperature by the temperature sensor 90 is changed by a predetermined value, the point of time when a time measured by the timer 50 has exceeded a predetermined time after turning on of the power source of the image pickup device, and/or the point of time when the number of times of operation of the shape memory alloy member 1 is changed by a predetermined value.

Setting the condition for performing the correction process as described above enables to accurately position the movable portion 5 to a specified targeted position by performing the correction process again if a displacement of the standby position is estimated, and enables to prevent a likelihood that the correction process may be performed, when unneeded.

In the shape memory alloy driving device, as the number of times of driving the shape memory alloy member 1 is increased, aging deterioration may occur, which may resultantly increase a displacement in the standby position. In view of the above, the correcting section 42 may update the second initial contact instruction value and the initial standby instruction value stored in the storing section 70 with the second actual contact instruction value and the actual standby instruction value, respectively, in the case where the number of times of operation counted by the operation time number counting section 60 is changed by a predetermined value. This arrangement enables to set the second initial contact instruction value for seeking the second contact position to a proper value, even if aging deterioration has occurred, which is advantageous in shortening a time required for a detection process.

Figure 11:
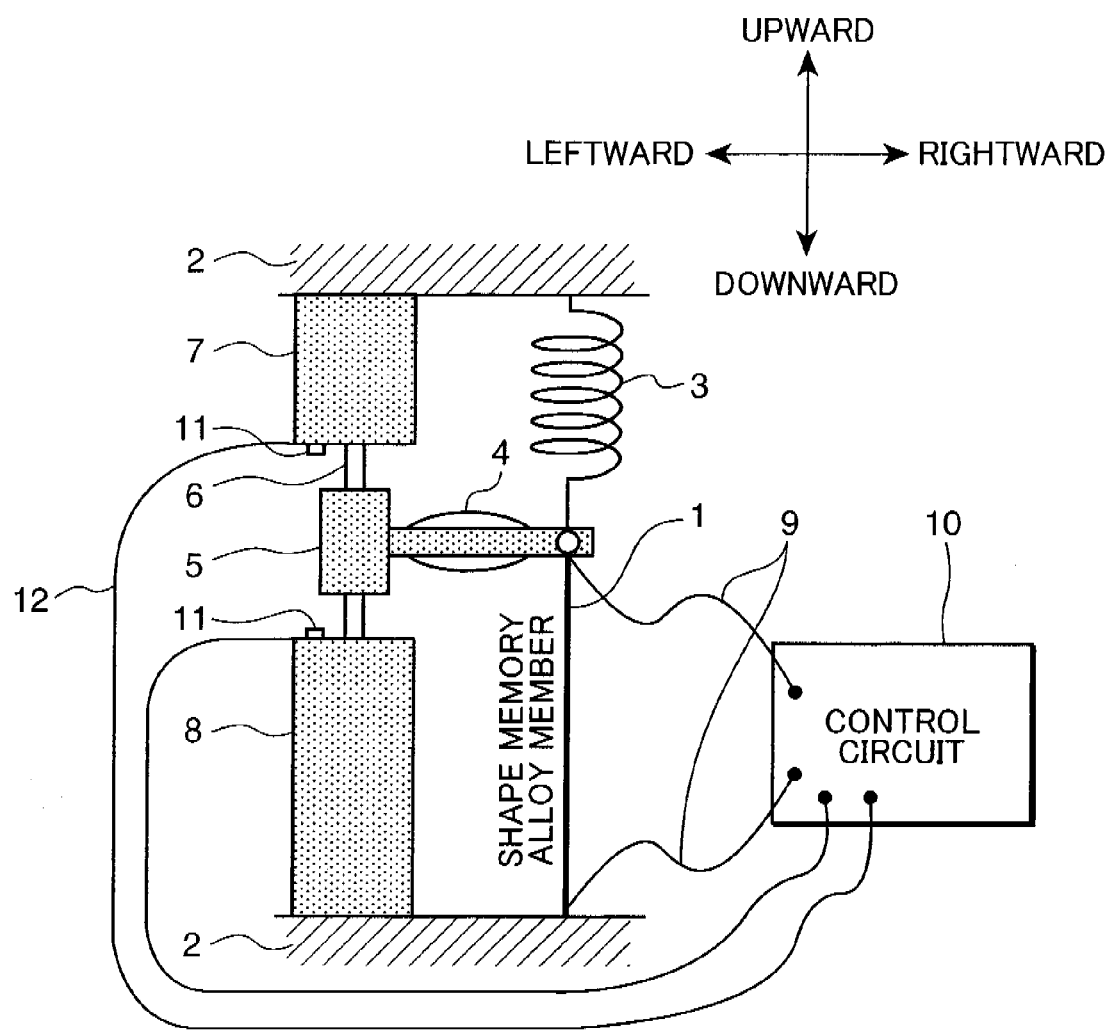
FIG. 11 is an external construction diagram of a shape memory alloy driving device provided with contact sensors.

In the foregoing description, the contact detecting section 41 determines the presence or absence of contact, based on a change in the resistance value. Alternatively, the presence or absence of contact may be determined by using a contact sensor. FIG. 11 is an external construction diagram of a shape memory alloy driving device provided with contact sensors 11.

The contact sensors 11 are disposed on a lower surface of a stopper 7, and an upper surface of a stopper 8, respectively. Examples of the contact sensor 11 are an electrical contact switch and a piezoelectric sensor.

Figure 12:
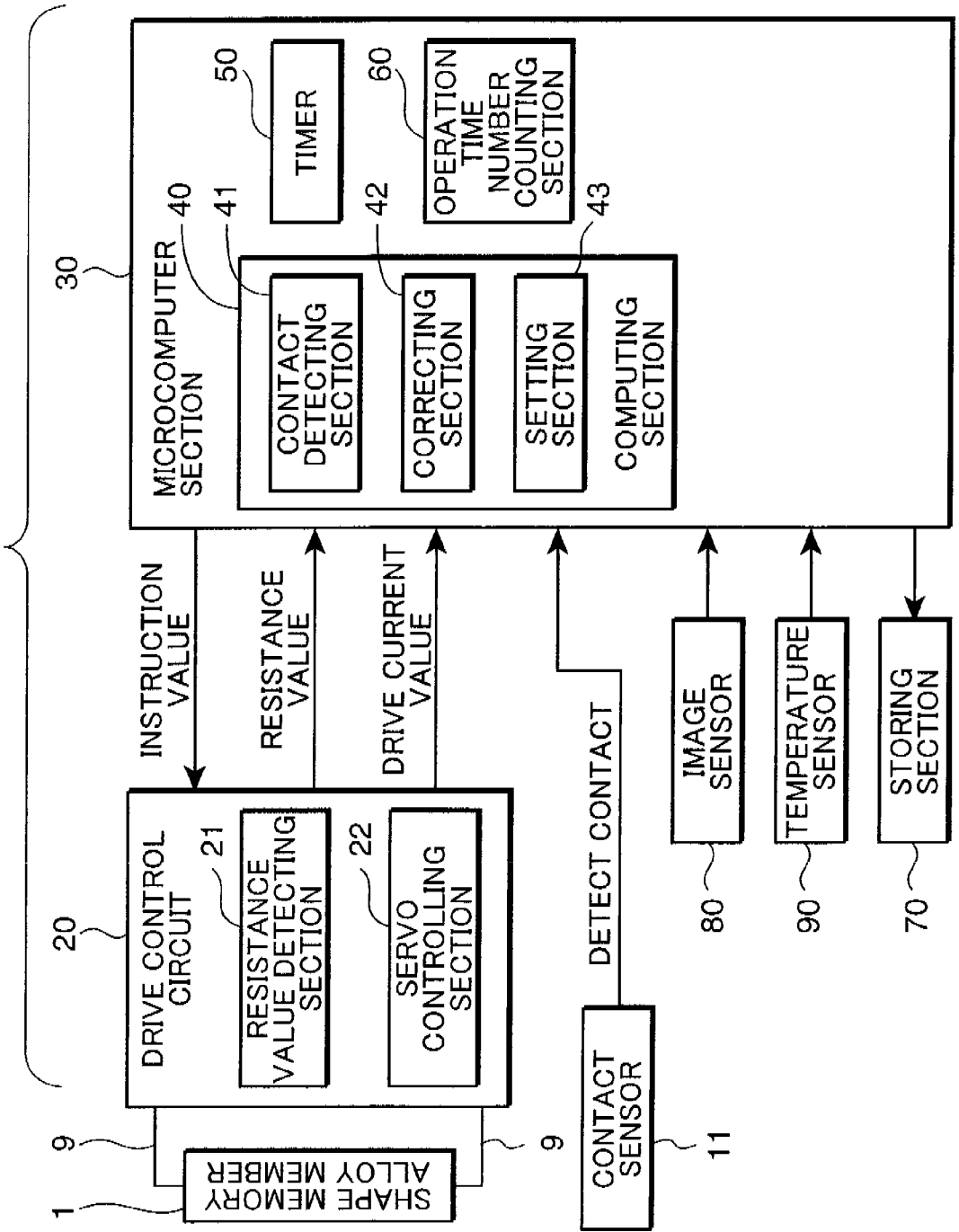
FIG. 12 is a block diagram of a control circuit shown in FIG. 11.

The contact sensors 11 are connected to a control circuit 10 through a conductive wire 12, and output signals indicating contact of the movable portion 5 with the stoppers 7 and 8, respectively. Since the arrangement other than the above in the modification is substantially the same as the arrangement shown in FIG. 1, description thereof is omitted herein. FIG. 12 is a block diagram of the control circuit 10 shown in FIG. 11. In the case where a contact detecting section 41 receives a signal indicating contact from the upper contact sensor 11, the contact detecting section 41 judges that the movable portion 5 has contacted with the stopper 7. In the case where the contact detecting section 41 receives a signal indicating non-contact from the upper contact sensor 11, the contact detecting section 41 judges that the movable portion 5 is away from the stopper 7. Further, the contact detecting section 41 judges contact/non-contact of the movable portion 5 with the stopper 8, using the lower contact sensor 11, in the same manner as the upper contact sensor 11.

In the foregoing description, the storing section 70 stores the first initial contact instruction value (Xstart), the second initial contact instruction value (Xstop), and the initial standby instruction value (Xstby). The invention is not limited to the above. Specifically, the storing section 70 may store in advance the second initial contact instruction value (Xstop), and a differential value (=Xstby−Xstop) between the initial standby instruction value (Xstby) and the second initial contact instruction value (Xstop). In the modification, the correcting section 42 may read out the differential value (=Xstby−Xstop) from the storing section 70, and calculate the actual standby instruction value (Xstby') by implementing the formula (1).

Further alternatively, the storing section 70 may store in advance the first initial contact instruction value (Xstart), and a differential value (=Xstby−Xstart) between the initial standby instruction value (Xstby) and the first initial contact instruction value (Xstart). In the modification, the correcting section 42 may read out the differential value (=Xstby−Xstart) from the storing section 70, and calculate the actual standby instruction value (Xstby') by implementing the formula (2).

(Second Embodiment)

Next, a shape memory alloy driving device as the second embodiment is described. Since the external arrangement and the block diagram in the second embodiment are substantially the same as those in the first embodiment, the second embodiment is described referring to FIGS. 1 and 2. Further, description on the elements in the second embodiment, which are substantially identical or equivalent to those in the first embodiment, is also omitted herein.

Figure 13:
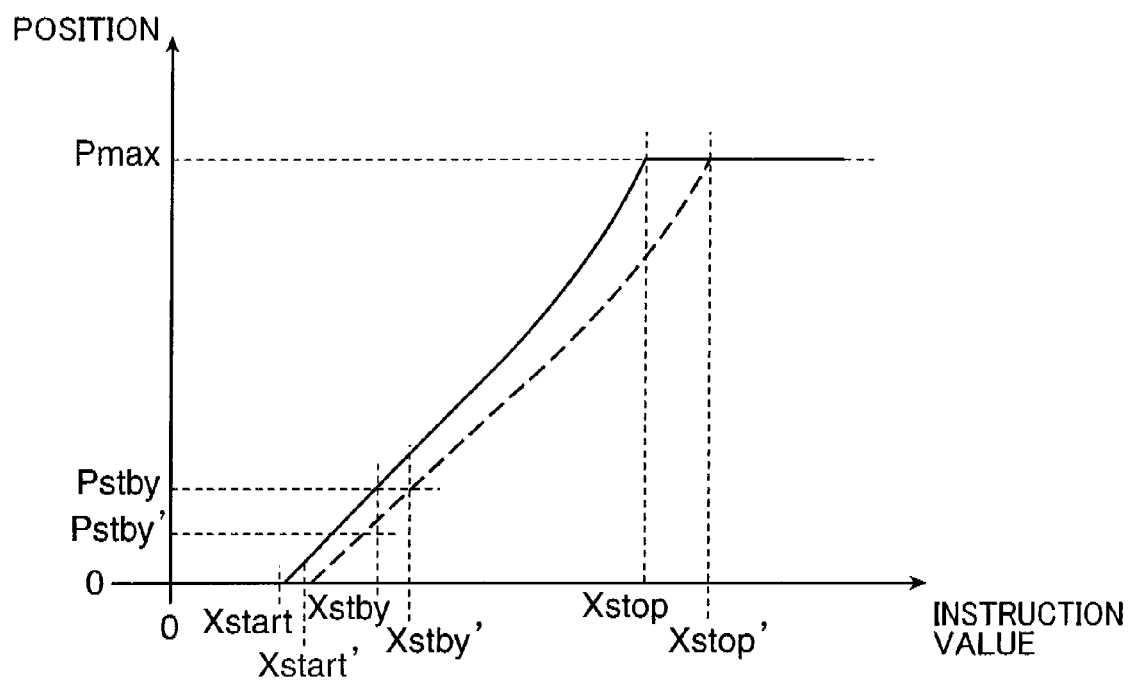
FIG. 13 is a diagram showing a relation between a position of a movable portion, and an instruction value.

FIG. 13 is a diagram showing a relation between a position of a movable portion 5 and an instruction value. The solid-line graph in FIG. 13 is a graph before the relation between a position of the movable portion 5 and an instruction value is changed, and the dotted line graph in FIG. 13 is a graph after the relation between a position of the movable portion 5 and an instruction value is changed from an initial state.

The relation between a position of the movable portion 5 and an instruction value may be shifted along the horizontal axis, and the gradients of the respective graphs may also be changed from each other, resulting from a change in the ambient temperature or aging deterioration of members such as the shape memory alloy member 1, as shown by the change from the solid-line graph to the dotted-line graph.

Assuming that the instruction value is set to Xstby, the movable portion 5 is positioned to Pstby', which is displaced from a specified standby position Pstby. Likewise, Xstart is displaced to Xstart', and Xstop is displaced to Xstop'. Xstart indicates a first initial contact instruction value.

Based on the above, the actual standby instruction value Xstby' can be obtained by storing the values Xstart, Xstop, and Xstby in advance into a storing section 70, allowing a correcting section 42 to acquire Xstart' and Xstop', which are instructions values for actually contacting the movable portion 5 with stoppers 7 and 8 respectively, and substituting the values Xstart' and Xstop' into the formula (3).

$$(Xstby'-Xstart'):(Xstop'-Xstart')=(Xstby-Xstart):(Xstop-Xstart) \ Xstby'=Xstart'+(Xstby-Xstart)\times(Xstop'-Xstart')/(Xstop-Xstart) \quad (3)$$

Specifically, the correcting section 42 calculates the actual standby instruction value Xstby' by correcting the initial standby instruction value Xstby, based on a differential value between the initial standby instruction value Xstby and the first initial contact instruction value Xstart, a differential value between the first actual contact instruction value Xstart' and the second actual contact instruction value Xstop', and a differential value between the first initial contact instruction value Xstart and the second initial contact instruction value Xstop.

Figure 14:
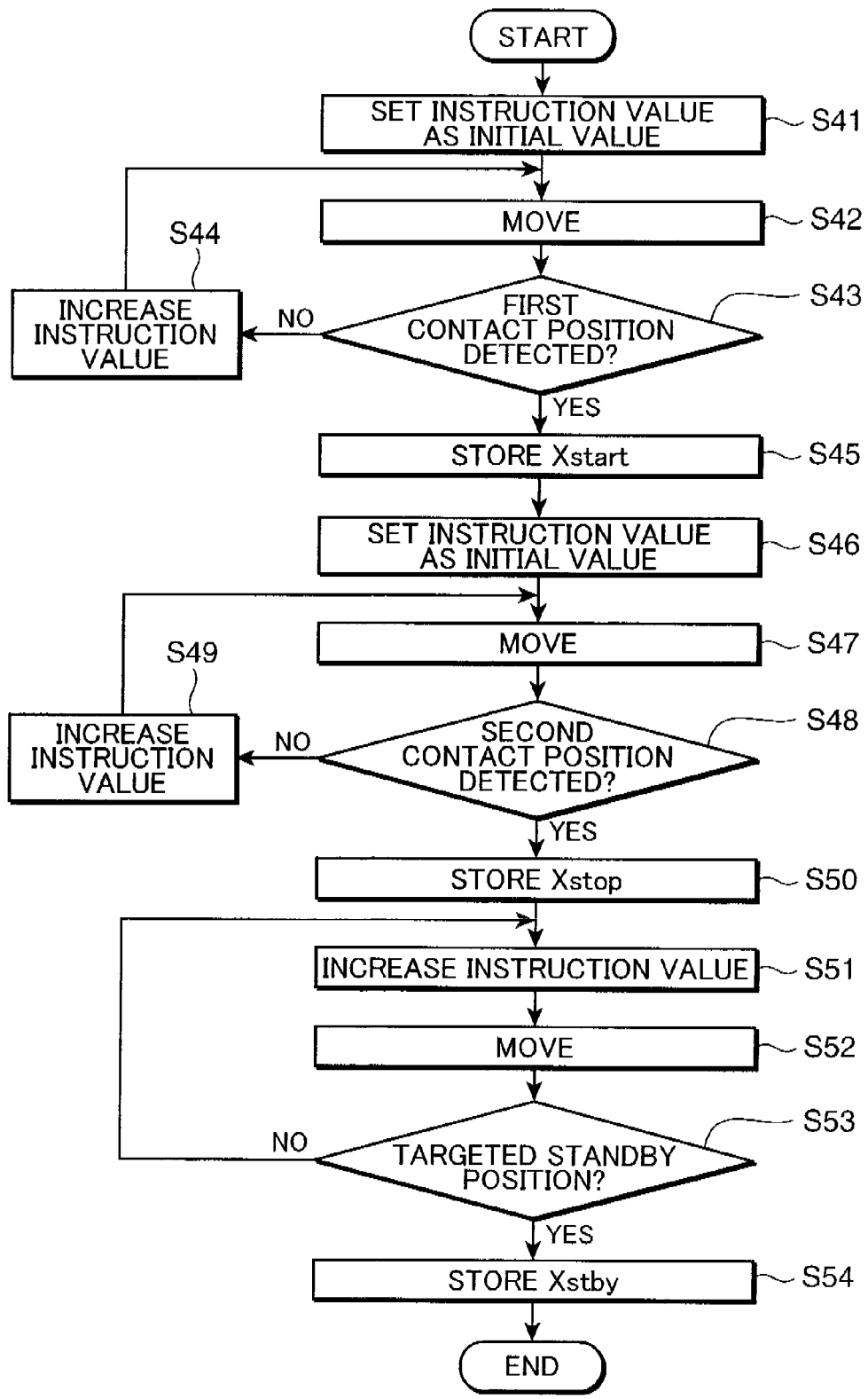
FIG. 14 is a flowchart showing an initial sequence.

Next, an initial sequence for detecting a first initial contact position, a second initial contact position, and an initial standby position is described. FIG. 14 is a flowchart showing the initial sequence. First, a setting section 43 sets an instruction value as an initial value to detect a first contact position (Step S41). In this embodiment, it is preferable to use a value sufficiently smaller than a value which is estimated to be the first initial contact instruction value, as the initial value.

Then, a servo controlling section 22 moves the movable portion 5 by adjusting a drive current to such a level that a resistance value detected by a resistance value detecting section 21 becomes equal to a resistance value corresponding to the instruction value set by the setting section 43 (Step S42). Then, a contact detecting section 41 detects whether the movable portion 5 has left the stopper 7 (Step S43). Then, in the case where the contact detecting section 41 detects that the movable portion 5 has left the stopper 7 (YES in Step S43), the setting section 43 writes the instruction value set in the above case into the storing section 70, as the first initial contact instruction value Xstart (Step S45).

If, on the other hand, the judgment result in Step S43 is negative (NO in Step S43), the setting section 43 increases the instruction value by a predetermined value (Step S44), and the routine returns to Step S42. Thus, the operations in Step S42 through Step S44 are repeated to detect the first initial contact instruction value Xstart.

Then, the setting section 43 sets an instruction value as an initial value to detect a second contact position (Step S46). Thereafter, the operations in Step S47 through Step S49 are repeated to detect the second contact position. Since the operations in Steps S47 through S50 are identical to those in Steps S2 through S5 shown in FIG. 9, description thereof is omitted herein.

Then, the setting section 43 resets the initial value to the first initial contact instruction value Xstart, and increases the first initial contact instruction value Xstart by a predetermined value (Step S51). Thereafter, the operations in Step S51 through Step S53 are repeated to move the movable portion 5 to a targeted standby position, detect the initial standby instruction value Xstby, and write the initial standby instruction value Xstby into the storing section 70. Since the operations in Steps S51 through S54 are identical to those in Steps S6 through S9 shown in FIG. 9, description thereof is omitted herein.

Thus, the initial sequence is ended. The initial sequence is performed in an adjusting step of a production process of the product, for instance.

Figure 15:
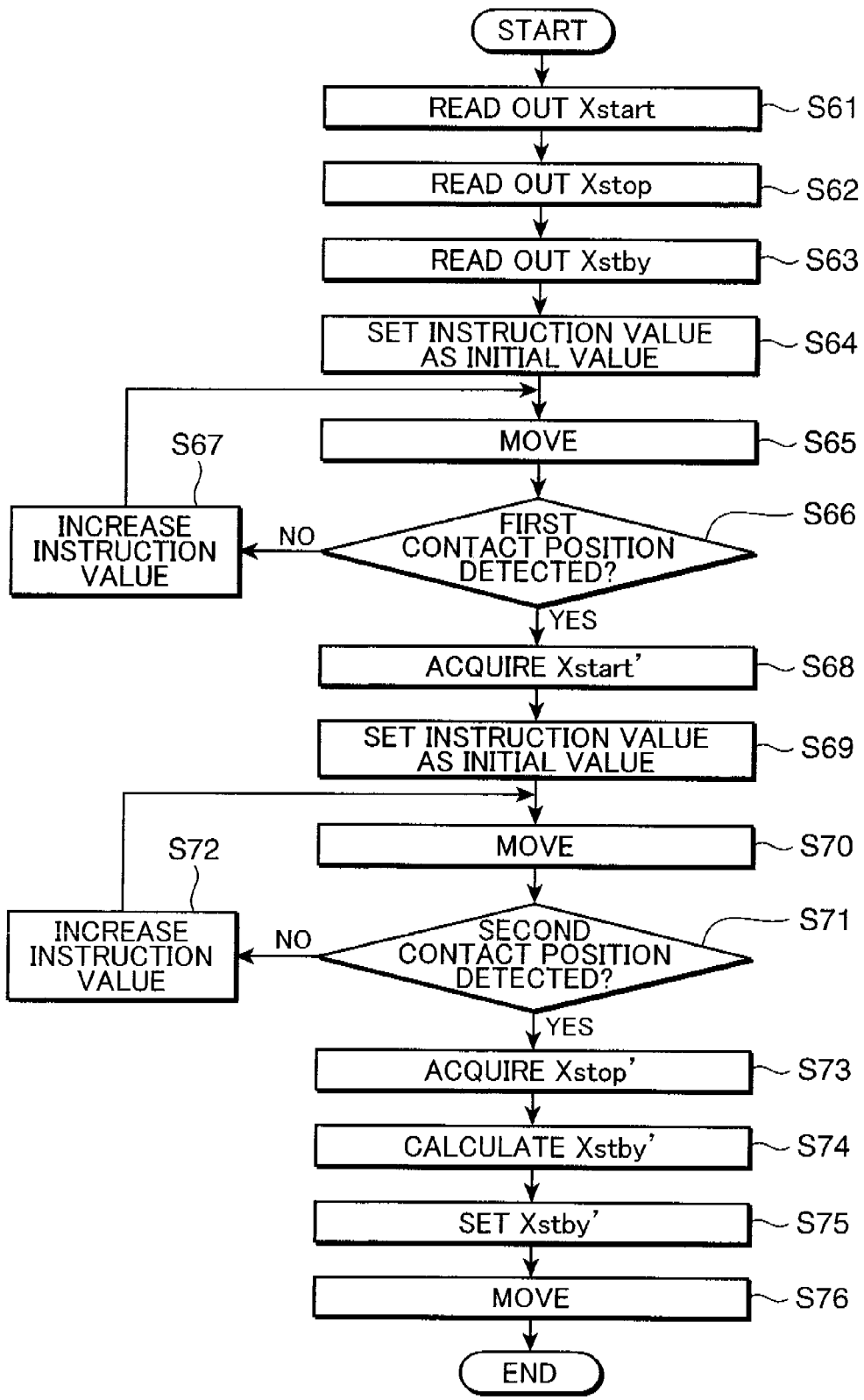
FIG. 15 is a flowchart showing a correction process.

Next, a correction process is described. FIG. 15 is a flowchart showing a correction process. First, the correcting section 42 reads out the first initial contact instruction value Xstart, the second initial contact instruction value Xstop, and the initial standby instruction value Xstby from the storing section 70 (Steps S61 through S63).

Then, the setting section 43 sets an instruction value as an initial value to detect the first contact position (Step S64). In this embodiment, it is preferable to use a value sufficiently smaller than the first initial contact instruction value, as the initial value.

Then, the servo controlling section 22 moves the movable portion 5 by adjusting the drive current to such a level that that a resistance value detected by the resistance value detecting section 21 becomes equal to a resistance value corresponding to the instruction value set by the setting section 43 (Step S65). Then, the contact detecting section 41 detects whether the movable portion 5 has left the stopper 7 (Step S66). Then, in the case where the contact detecting section 41 detects that the movable portion 5 has left the stopper 7 (YES in Step S66), the correcting section 42 acquires the instruction value set by the setting section 43 in the above case, as the first actual contact instruction value Xstart' (Step S68).

If, on the other hand, the judgment result in Step S66 is negative (NO in Step S66), the setting section 43 increases the instruction value by a predetermined value (Step S67), and the routine returns to Step S65. Since the operations in Step S69 through Step S73 are identical to those in Step S23 through Step S27 shown in FIG. 10, description thereof is omitted herein.

Then, the correcting section 42 calculates the actual standby instruction value Xstby' by substituting the first initial contact instruction value Xstart read out in Step S61, the second initial contact instruction value Xstop read out in Step S62, the initial standby instruction value Xstby read out in Step S63, the first actual contact instruction value Xstart' acquired in Step S66, and the second actual contact instruction value Xstop' acquired in Step S73 into the formula (3) (Step S74).

Since the operations in Steps S75 through S76 are identical to those in Steps S29 through S30 shown in FIG. 10, description thereof is omitted herein. Thus, the correction process is ended, the correction sequence is completed, and an image pickup device is brought to a standby state.

As described above, since the shape memory alloy driving device of the second embodiment is operable to calculate the actual standby instruction value by correcting the initial standby instruction value, using the formula (3), the shape memory alloy driving device is advantageous in precisely positioning the movable portion 5 to a specified standby position.

A condition for performing the correction process in the second embodiment may be set in the similar manner as the first embodiment. Further alternatively, the contact detecting section 41 may detect the presence or absence of contact, using contact sensors 11. Further alternatively, the first initial contact instruction value and the second initial contact instruction value may be updated with the first actual contact instruction value and the second actual contact instruction value respectively, and the initial standby instruction value may be updated with the actual standby instruction value, each time the number of times of operation reaches a predetermined number.

The following is a summary of the embodiments of the invention.

(1) A shape memory alloy driving device includes a movable portion; a moving mechanism portion which includes a shape memory alloy member, and moves the movable portion; a restraining member which is contactable with the movable portion to thereby restrain a movement of the movable portion, and defines a moving range of the movable portion; a drive control section which outputs a drive signal in accordance with an instruction value for positioning the movable portion to the shape memory alloy member, and controls the moving mechanism portion to move the movable portion by deforming the shape of the shape memory alloy member; a contact detecting section which detects whether the movable portion is positioned to a contact portion in contact with the restraining member; a storing section which stores initial position information for determining a relation between a position of the movable portion and an instruction value in an initial state; a correcting section which calculates an actual standby instruction value, based on an actual contact instruction value obtained when the contact detecting section has detected that the movable portion is positioned to the contact portion, and the initial position information; and a setting section which sets a standby position corresponding to the actual standby instruction value, as an actual standby position of the movable portion.

In the above arrangement, the actual standby instruction value is calculated, based on the actual contact instruction value obtained when the contact detecting section has detected that the movable portion is positioned to the contact portion, and the initial position information for determining the relation between a position of the movable portion and an instruction value in the initial state; and the standby position corresponding to the actual standby instruction value is set as the actual standby position of the movable portion. Accordingly, even if the standby position is displaced from a specified standby position, resulting from e.g. a change in the characteristic of the shape memory alloy member due to a change in the ambient temperature or deterioration of the shape memory alloy member, the movable portion can be precisely positioned to the specified standby position.

(2) Preferably, the initial position information may include an initial contact instruction value which is predefined as an instruction value for positioning the movable portion to the contact position, and an initial standby instruction value which is predefined as an instruction value for positioning the movable portion to the standby position, and the setting section may calculate the actual standby instruction value, based on the actual contact instruction value, the initial contact instruction value, and the initial standby instruction value.

In the above arrangement, the actual standby instruction value is calculated, based on the actual contact instruction value obtained when the contact detecting section has detected that the movable portion is positioned to the contact position, the initial contact instruction value, and the initial standby instruction value; and the standby position corresponding to the actual standby instruction value is set as the actual standby position of the movable portion. Accordingly, even if the standby position is displaced from a specified standby position, resulting from e.g. a change in the characteristic of the shape memory alloy member due to a change in the ambient temperature or deterioration of the shape memory alloy member, the movable portion can be precisely positioned to the specified standby position.

(3) Preferably, the initial position information may include an initial contact instruction value which is predefined as an instruction value for positioning the movable portion to the contact position, and a differential value between an initial standby instruction value which is predefined as an instruction value for positioning the movable portion to the standby position, and the initial contact instruction value, and the setting section may calculate the actual standby instruction value, based on the differential value and the actual contact instruction value.

In the above arrangement, the actual standby instruction value is calculated, based on he differential value between the initial standby instruction value and the initial contact instruction value, and the actual contact instruction value obtained when the contact detecting section has detected that the movable portion is positioned to the contact position; and the standby position corresponding to the actual standby instruction value is set as the actual standby position of the movable portion. Accordingly, even if the standby position is displaced from a specified standby position, resulting from e.g. a change in the characteristic of the shape memory alloy member due to a change in the ambient temperature or deterioration of the shape memory alloy member, the movable portion can be precisely positioned to the specified standby position.

(4) Preferably, the correcting section may calculate the actual standby instruction value, based on a displacement between the actual contact instruction value and the initial contact instruction value.

In the above arrangement, since the actual standby instruction value is calculated, based on the displacement between the actual contact instruction value obtained when the contact detecting section has detected that the movable portion is positioned to the contact position, and the initial contact instruction value, the movable portion can be precisely positioned to a specified standby position.

(5) Preferably, the restraining member may include a first restraining member which restrains a movement of the movable portion over one of upper and lower limits of the moving range, and a second restraining member which restrains a movement of the movable portion over the other of the upper and lower limits of the moving range, the contact detecting section may detect whether the movable portion is positioned to a first contact position where the movable portion is contacted with the first restraining member, and detect whether the movable portion is positioned to a second contact position where the movable portion is contacted with the second restraining member, the initial contact instruction value may include a first initial contact instruction value which is predefined as an instruction value for positioning the movable portion to the first contact position, and a second initial contact instruction value which is predefined as an instruction value for positioning the movable portion to the second contact position, the actual contact instruction value may include a first actual contact instruction value obtained when the contact detecting section has detected that the movable portion is positioned to the first contact position, and a second actual contact instruction value obtained when the contact detecting section has detected that the movable portion is positioned to the second contact position, and the correcting section may calculate the actual standby instruction value, based on the first initial contact instruction value, the second initial contact instruction value, the first actual contact instruction value, and the second actual contact instruction value.

In the above arrangement, since the actual standby instruction value is calculated, based on the initial standby instruction value, the first initial contact instruction value, the second initial contact instruction value, the first actual contact instruction value, and the second actual contact instruction value, the movable portion can be precisely positioned to a specified standby position.

(6) Preferably, the contact detecting section may detect a change in a resistance value of the shape memory alloy member to thereby detect the contact position.

In the above arrangement, since the contact position is detected by detecting a change in the resistance value of the shape memory alloy member, the contact position can be precisely detected. Specifically, there is a large difference between a resistance value change ratio with respect to a temperature when the shape memory alloy member is not deformed, and a resistance value change ratio with respect to a temperature when the shape memory alloy member is deformed. Accordingly, the resistance value is greatly changed at a time when the movable portion is about to contact with the restraining member, or is about to leave the restraining member. In view of the above, the presence or absence of contact of the movable portion with the restraining member can be precisely detected by detecting a change in the resistance value. Further, the above arrangement enables to detect the presence or absence of contact, without providing a contact sensor, which is advantageous in saving the space and the cost.

(7) Preferably, the contact detecting section may detect a change in a current flowing through the shape memory alloy member or a voltage corresponding to the current to thereby detect the contact position.

In the above arrangement, since the contact position is detected by detecting a change in the current flowing through the shape memory alloy member or the voltage corresponding to the current, the contact position can be precisely detected. Specifically, when the movement of the movable portion is restricted by the restraining member, the drive control section greatly changes the current or the voltage, if the drive control section is so designed as to perform servo control, while using the instruction value as a target value. This arrangement enables to precisely detect the presence or absence of contact of the movable portion with the restraining member by detecting a change in the current or the voltage. Further, the above arrangement enables to detect the presence or absence of contact, without providing a sensor, which is advantageous in saving the space and the cost.

(8) Preferably, the contact detecting section may be a contact sensor which is disposed at such a position as to detect a contact of the movable portion with the restraining member. In this arrangement, since the contact of the movable portion with the restraining member is detected by the contact sensor, the presence or absence of contact can be securely detected.

(9) Preferably, the movable portion may hold an image pickup lens for use in an image pickup device, and the standby position may be a reference focus position of the image pickup device.

In an image pickup device provided with an auto-focus function, there is a case that the standby position is set to a reference focus position where image data of a subject is approximately focused before start of focus adjustment. The above arrangement enables to precisely position the movable portion to a specified reference focus position, even if the reference focus position is displaced from the specified reference focus position.

(10) Preferably, the movable portion may hold an image pickup lens for use in an image pickup device, and the standby position may be a reference zoom position of the image pickup device. In an image pickup device provided with a zoom function, there is a case that the standby position is required to be set to a reference zoom position where the entirety of a subject is approximately captured before start of zoom adjustment. The above arrangement enables to precisely position the movable portion to a specified reference zoom position, even if the reference zoom position is displaced from the specified reference zoom position.

(11) Preferably, the correcting section may calculate the actual standby instruction value when a power source of an image pickup device is turned on. In this arrangement, since the actual standby instruction value is calculated each time the power source is turned on, the movable portion can be precisely positioned to a specified standby position.

(12) Preferably, the shape memory alloy driving device may further include a temperature detecting section which detects an ambient temperature, wherein the correcting section calculates the actual standby instruction value, when the temperature detected by the temperature detecting section has changed by a predetermined value. In this arrangement, since the actual standby instruction value is calculated each time the temperature is changed by the predetermined value, the movable portion can be precisely positioned to a specified standby position, even if the standby position is displaced from the specified standby position resulting from a change in the ambient temperature.

(13) Preferably, the shape memory alloy driving device may further include a time measuring section which measures an operation time, wherein the correcting section calculates the actual standby instruction value, when the operation time measured by the time measuring section has exceeded a predetermined time. In this arrangement, since the actual standby instruction value is calculated each time the operation time is changed by the predetermined value, the movable portion can be precisely positioned to a specified standby position, even if the standby position is displaced from the specified standby position, as the operation time is elapsed.

(14) Preferably, the shape memory alloy driving device may further include a number counting section which counts the number of times of operation, wherein the correcting section calculates the actual standby instruction value, when the number of times of operation counted by the number counting section has changed by a predetermined value. In this arrangement, since the actual standby instruction value is calculated each time the number of times of operation is changed by the predetermined value, the movable portion can be precisely positioned to a specified standby position, even if the standby position is displaced from the specified standby position due to a long-term use.

(15) Preferably, the shape memory alloy driving device may further include a number counting section which counts the number of times of operation, wherein the correcting section updates the initial contact instruction value and the initial standby instruction value with the actual contact instruction value and the actual standby instruction value respectively, when the number of times of operation counted by the number counting section has changed by a predetermined value. In the above arrangement, since the initial contact instruction value is updated with a most-recently detected actual contact instruction value, and the initial standby position is updated with a most-recently detected actual standby position, the time required for detection can be shortened, which is advantageous in performing a high-speed correction process.

The invention claimed is:
1. A shape memory alloy driving device, comprising:
a movable portion;
a moving mechanism portion which includes a shape memory alloy member, and moves the movable portion;

a restraining member which is contactable with the movable portion to thereby restrain a movement of the movable portion, and defines a moving range of the movable portion;

a drive control section which outputs a drive signal in accordance with an instruction value for positioning the movable portion to the shape memory alloy member, and controls the moving mechanism portion to move the movable portion by deforming the shape of the shape memory alloy member;

a contact detecting section which detects whether the movable portion is positioned to a contact position in contact with the restraining member;

a storing section which stores initial position information for determining a relation between a position of the movable portion and an instruction value in an initial state;

a correcting section which calculates an actual standby instruction value, based on an actual contact instruction value obtained when the contact detecting section has detected that the movable portion is positioned to the contact position, and the initial position information; and a setting section which sets a standby position corresponding to the actual standby instruction value, as an actual standby position of the movable portion.

2. The shape memory alloy driving device according to claim 1, wherein the initial position information includes an initial contact instruction value which is predefined as an instruction value for positioning the movable portion to the contact position, and an initial standby instruction value which is predefined as an instruction value for positioning the movable portion to the standby position, and the setting section calculates the actual standby instruction value, based on the actual contact instruction value, the initial contact instruction value, and the initial standby instruction value.

3. The shape memory alloy driving device according to claim 1, wherein the initial position information includes an initial contact instruction value which is predefined as an instruction value for positioning the movable portion to the contact position, and a differential value between an initial standby instruction value which is predefined as an instruction value for positioning the movable portion to the standby position, and the initial contact instruction value, and the setting section calculates the actual standby instruction value, based on the differential value and the actual contact instruction value.

4. The shape memory alloy driving device according to claim 2, wherein the correcting section calculates the actual standby instruction value, based on a displacement between the actual contact instruction value and the initial contact instruction value.

5. The shape memory alloy driving device according to claim 2, wherein the restraining member includes a first restraining member which restrains a movement of the movable portion over one of upper and lower limits of the moving range, and a second restraining member which restrains a movement of the movable portion over the other of the upper and lower limits of the moving range, the contact detecting section detects whether the movable portion is positioned to a first contact position where the movable portion is contacted with the first restraining member, and detects whether the movable portion is positioned to a second contact position where the movable portion is contacted with the second restraining member, the initial contact instruction value includes a first initial contact instruction value which is predefined as an instruction value for positioning the movable portion to the first contact position, and a second initial contact instruction value which is predefined as an instruction value for positioning the movable portion to the second contact position, the actual contact instruction value includes a first actual contact instruction value obtained when the contact detecting section has detected that the movable portion is positioned to the first contact position, and a second actual contact instruction value obtained when the contact detecting section has detected that the movable portion is positioned to the second contact position, and the correcting section calculates the actual standby instruction value, based on the first initial contact instruction value, the second initial contact instruction value, the first actual contact instruction value, and the second actual contact instruction value.

6. The shape memory alloy driving device according to claim 1, wherein the contact detecting section detects a change in a resistance value of the shape memory alloy member to thereby detect the contact position.

7. The shape memory alloy driving device according to claim 1, wherein the contact detecting section detects a change in a current flowing through the shape memory alloy member or a voltage corresponding to the current to thereby detect the contact position.

8. The shape memory alloy driving device according to claim 1, wherein the contact detecting section is a contact sensor which is disposed at such a position as to detect a contact of the movable portion with the restraining member.

9. The shape memory alloy driving device according to claim 1, wherein the movable portion holds an image pickup lens for use in an image pickup device, and the standby position is a reference focus position of the image pickup device.

10. The shape memory alloy driving device according to claim 1, wherein the movable portion holds an image pickup lens for use in an image pickup device, and the standby position is a reference zoom position of the image pickup device.

11. The shape memory alloy driving device according to claim 1, wherein the correcting section calculates the actual standby instruction value when a power source of an image pickup device is turned on.

12. The shape memory alloy driving device according to claim 1, further comprising:

a temperature detecting section which detects an ambient temperature, wherein the correcting section calculates the actual standby instruction value, when the temperature detected by the temperature detecting section has changed by a predetermined value.

13. The shape memory alloy driving device according to claim 1, further comprising:

a time measuring section which measures an operation time, wherein the correcting section calculates the actual standby instruction value, when the operation time measured by the time measuring section has exceeded a predetermined time.

14. The shape memory alloy driving device according to claim 1, further comprising:
a number counting section which counts the number of times of operation, wherein
the correcting section calculates the actual standby instruction value, when the number of times of operation counted by the number counting section has changed by a predetermined value.

15. The shape memory alloy driving device according to claim 2, further comprising:
a number counting section which counts the number of times of operation, wherein
the correcting section updates the initial contact instruction value and the initial standby instruction value with the actual contact instruction value and the actual standby instruction value respectively, when the number of times of operation counted by the number counting section has changed by a predetermined value.

16. A shape memory alloy driving device, comprising;
a movable portion;
a moving mechanism portion which includes a shape memory alloy member, and moves the movable portion;
a restraining member which is contactable with the movable portion to thereby restrain a movement of the movable portion, and defines a moving range of the movable portion;
a drive control section which outputs a drive current in accordance with an instruction value for positioning the movable portion to the shape memory alloy member, and controls the moving mechanism portion to move the movable portion by deforming the shape of the shape memory alloy member;
a contact detecting section which detects whether the movable portion is positioned to a contact position in contact with the restraining member by detecting a change of the drive current;
a storing section which stores initial position information for determining a relation between a position of the movable portion and an instruction value in an initial state;
a correcting section which calculates an actual standby instruction value, based on an actual contact instruction value obtained when the contact detecting section has detected that the movable portion is positioned to the contact position, and the initial position information; and
a setting section which sets a standby position corresponding to the actual standby instruction value, as an actual standby position of the movable portion,
wherein the drive control section adjusts the drive current to such a level that a resistance value of the shape memory alloy member becomes equal to a resistance value corresponding to the instruction value, and
wherein the contact detecting section detects the contact position by detecting an inflection point of the drive current which appears as the instruction value is gradually increased.

17. The shape memory alloy driving device according to claim 16, wherein the initial position information includes an initial contact instruction value which is predefined as an instruction value for positioning the movable portion to the contact position, and an initial standby instruction value which is predefined as an instruction value for positioning the movable portion to the standby position, and the setting section calculates the actual standby instruction value, based on the actual contact instruction value, the initial contact instruction value, and the initial standby instruction value.

18. The shape memory alloy driving device according to claim 17, wherein
the initial position information includes an initial contact instruction value which is predefined as an instruction value for positioning the movable portion to the contact position, and a differential value between an initial standby instruction value which is predefined as an instruction value for positioning the movable portion to the standby position, and the initial contact instruction value, and
the setting section calculates the actual standby instruction value, based on the differential value and the actual contact instruction value.

19. The shape memory alloy driving device according to claim 18, wherein the correcting section calculates the actual standby instruction value, based on a displacement between the actual contact instruction value and the initial contact instruction value.

20. The shape memory alloy driving device according to claim 18, wherein
the restraining member includes a first restraining member which restrains a movement of the movable portion over one of upper and lower limits of the moving range, and a second restraining member which restrains a movement of the movable portion over the other of the upper and lower limits of the moving range,
the contact detecting section detects whether the movable portion is positioned to a first contact position where the movable portion is contacted with the first restraining member, and detects whether the movable portion is positioned to a second contact position where the movable portion is contacted with the second restraining member,
the initial contact instruction value includes a first initial contact instruction value which is predefined as an instruction value for positioning the movable portion to the first contact position, and a second initial contact instruction value which is predefined as an instruction value for positioning the movable portion to the second contact position,
the actual contact instruction value includes a first actual contact instruction value obtained when the contact detecting section has detected that the movable portion is positioned to the first contact position, and a second actual contact instruction value obtained when the contact detecting section has detected that the movable portion is positioned to the second contact position, and
the correcting section calculates the actual standby instruction value, based on the first initial contact instruction value, the second initial contact instruction value, the first actual contact instruction value, and the second actual contact instruction value.

* * * * *